(12) United States Patent
Sengupta et al.

(10) Patent No.: US 10,158,911 B1
(45) Date of Patent: Dec. 18, 2018

(54) SYSTEMS AND METHODS FOR MANAGING STORAGE OF DUPLICATE COPIES OF A MEDIA ASSET AT A STORAGE DEVICE

(71) Applicant: Rovi Guides, Inc., San Jose, CA (US)

(72) Inventors: Lopamudra Sengupta, San Jose, CA (US); Milan Indu Patel, Santa Clara, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/842,564

(22) Filed: Dec. 14, 2017

(51) Int. Cl.
| | |
|---|---|
| *H04N 9/80* | (2006.01) |
| *H04N 5/93* | (2006.01) |
| *H04N 21/4335* | (2011.01) |
| *G06F 17/30* | (2006.01) |
| *H04N 21/45* | (2011.01) |
| *H04N 21/41* | (2011.01) |
| *H04N 21/218* | (2011.01) |
| *H04N 21/472* | (2011.01) |
| *H04N 21/4402* | (2011.01) |
| *H04N 21/4147* | (2011.01) |
| *H04N 21/435* | (2011.01) |

(52) U.S. Cl.
CPC ..... *H04N 21/4335* (2013.01); *G06F 17/3056* (2013.01); *G06F 17/30864* (2013.01); *H04N 21/2181* (2013.01); *H04N 21/4126* (2013.01); *H04N 21/4147* (2013.01); *H04N 21/435* (2013.01); *H04N 21/440218* (2013.01); *H04N 21/4532* (2013.01); *H04N 21/47217* (2013.01)

(58) Field of Classification Search
CPC ........... H04N 21/4335; H04N 21/4147; H04N 21/2181; H04N 21/435; H04N 21/47202; H04N 21/4532; H04N 21/4402; H04N 21/4227; H04N 21/4828; H04N 21/44008
USPC .......................... 386/248, 252, 278, 280, 239
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 9,756,389 B2 | 9/2017 | Randall et al. | |
| 2002/0174430 A1 | 11/2002 | Ellis et al. | |
| 2005/0251827 A1 | 11/2005 | Ellis et al. | |
| 2006/0215991 A1 | 9/2006 | Larson et al. | |
| 2008/0310734 A1* | 12/2008 | Ahammad | G06F 17/30781 382/209 |
| 2009/0187951 A1* | 7/2009 | McCarthy | H04N 5/76 725/58 |
| 2010/0153885 A1 | 6/2010 | Yates | |

* cited by examiner

*Primary Examiner* — Robert Chevalier
(74) *Attorney, Agent, or Firm* — Haley Guiliano LLP

(57) ABSTRACT

Systems and methods are disclosed herein for detecting duplicate copies of a media asset and deleting or offloading one of the duplicate copies to different user devices. Specifically, a media guidance application, implemented at user equipment, may be used to record or store media assets from different media sources. The media guidance application may detect a duplicate copy of a previously stored media asset by comparing various attributes of the media asset. After detecting a duplicate copy of a media asset, the media guidance application may determine which of the duplicate copies of the same media asset is to be deleted, or to be transmitted for storage at a different user device.

20 Claims, 13 Drawing Sheets

SYSTEMS AND METHODS FOR MANAGING STORAGE OF DUPLICATE COPIES OF A MEDIA ASSET AT A STORAGE DEVICE

BACKGROUND

Existing media systems use a media asset identifier to identify each media program. However, different media recordings having different media asset identifiers can correspond to the same media program. For example, an episode of "Big Bang Theory" may be recorded from the NBC channel, and assigned with one identifier and the same episode of "Big Bang Theory" may be recorded from the SHOWTIME channel and assigned a different identifier. When the existing media system, such as a personal recorder, uses the media asset identifiers to arrange and sort the recorded media programs, the duplicate copy of the same recorded episode may not be identified and thus wastes storage space on the digital video recorder (DVR).

SUMMARY

Accordingly, systems and methods are disclosed herein for detecting duplicate copies of a media asset and saving different duplicate copies at different user devices and/or deleting one of the duplicates. Specifically, a media guidance application, implemented at user equipment, may be used to record or store media assets from different media sources. The media guidance application may detect a duplicate copy of a previously stored media asset by comparing various attributes of the media asset, e.g., the media asset title, the media asset description, the casting member list corresponding to the media asset, the media asset episode index, the media asset season index, and/or the like. After detecting a duplicate copy of a media asset, the media guidance application may determine which of the duplicate copies of the same media asset is to be deleted and/or transferred for storage to a different user device.

The media guidance application may identify a first media asset from a database of previously stored media assets, and determine a first set of attributes corresponding to the first media asset. For example, in some embodiments, the media guidance application may retrieve metadata corresponding to the first media asset, and a list of pre-defined attribute types, such as but not limited to an English title corresponding to the first media asset, a title in a foreign language corresponding to the first media asset an index corresponding to the media asset, a description of the media asset, an actor name corresponding to the media asset, a director name corresponding to the media asset, a display resolution parameter corresponding to the media asset, a media asset length, a user rating, and a media asset rating corresponding to the media asset, and/or the like. For each pre-defined attribute type from the list of pre-defined attribute types, the media guidance application may parse the metadata to extract data corresponding to the pre-defined attribute type.

The media guidance application may search for a second media asset that is also stored and that has a matching attribute with one or more of the first set of attributes, and receive a second media asset that has matching attributes with the one or more attributes and a second set of attributes corresponding to the second media asset. For example, the second media asset may have the same title as the first media asset. For another example, the media guidance application may extract a first set of frames from the first media asset and a second set of frames from the second media asset, and compare the two sets of frames to determine whether the two sets of frames share overlapping features that exceeds a similarity threshold.

The media guidance application may compare the first set of attributes corresponding to the first media asset with the second set of attributes corresponding to the second media asset to generate a similarity metric between the first media asset and the second media asset. For example, in some embodiments, for each attribute from the first set of attributes, the media guidance application may form a query on the second set of attributes based on the respective attribute. The media guidance application may determine, in response to the formed query, whether a respective matching attribute that overlaps with the respective attribute for more than a pre-defined threshold is identified within the second set of attributes. In response to determining that the respective matching attribute that overlaps with the respective attribute for more than the pre-defined threshold is identified within the second set of attributes, the media guidance application may identify a respective overlap percentage that the respective attribute from the first set of attributes overlaps with the respective matching attribute from the second set of attributes. The media guidance application may retrieve attributes from the first set of attributes that have a respective matching attribute from the second set of attributes. The media guidance application may determine the similarity metric between the first media asset and the second media asset by computing a weighted sum over all overlap percentages between the retrieved attributes and their respective matching attributes. Each overlap percentage may be weighted by a pre-defined weight corresponding to a type of the respective attribute.

In some embodiments, the media guidance application may compare attributes of different data formats, e.g., the same attribute type may be represented in different data formats in the first set and the second set of attributes. For example, the media guidance application may retrieve a first attribute having a first data format from the first set of attributes and a second attribute having a second data format from the second set of attributes. The media guidance application may translate, via a lookup table specifying variations of data formats corresponding to each attribute type, the first attribute having the first data format to the second data format, and then compare the translated first attribute with the second attribute.

The media guidance application may then determine whether the first media asset and the second media asset correspond to the same media content based on the similarity metric. For example, the media guidance application may compare whether the similarity metric is greater than a pre-defined similarity threshold.

In some embodiments, the media guidance application may determine the first media asset and the second media asset correspond to the same media content by applying a comparison logic rule. The comparison logic rule specifies a matching scenario where an attribute match for a first type of attribute and an attribute mismatch for a second type of attribute are identified. For example, two media assets may have the same title, the same actor, but a different production year. In this case, the two media assets may have a high similarity metric, but are still deemed different. The media guidance application may determine whether attributes of the first type and of second type from the first set of attributes and counterpart attributes of the first type and of second type from the second set of attributes satisfy the matching scenario specified in the comparison logic rule. In response to determining that the attributes of the first type and of second type from the first set of attributes and the counterpart attributes of the first type and of second type from the second set of attributes satisfy the matching scenario specified in the comparison logic rule, the media guidance application may apply a comparison result specified in the comparison logic rule that indicates whether the first media asset and the second media asset correspond to the same media content.

After determining that the first media asset and the second media asset correspond to the same media content, the media guidance application may select an action to perform relative to one of the first media asset and the second media asset based at least in part on the first set of attributes and the second set of attributes, e.g., to delete one of the duplicate copies, to offload one of the duplicate copies for storage at a different storage device, etc.

In some embodiments, the media guidance application may determine a confidence level relating to automatically performing the selected action relative to the one of the first media asset and the second media asset. For example, the media guidance application may combine the similarity metric and a success metric to generate the confidence level. The success metric represents a past success rate of incidents when no user correction was received to revert automatic performance of the action. For example, the media guidance application may retrieve and search a record of previously performed actions and respective media assets that the actions have been previously performed, based on one or more attributes corresponding to the one of the first media asset and the second media asset. The media guidance application may then calculate the success metric as a percentage of successful occurrences among the subset of previously performed actions. In each successful occurrence, no user correction to revert the respective action was requested after the respective action was automatically performed. The media guidance application may then determine the confidence level as a weighted sum of the similarity metric and the success metric using pre-defined weights.

In response to determining that the confidence level is greater than a pre-defined confidence threshold, the media guidance application may automatically perform the determined action relative to the one of the first media asset and the second media asset, e.g., to delete or offload the duplicate copy to a different device.

In response to determining that the first media asset and the second media asset correspond to the same media content, the media guidance application may retrieve information relating to a first storage device (e.g., a local storage device associated with a personal video recorder, etc.) and a second storage device (e.g., a user mobile device) corresponding to a user profile. The media guidance application may determine whether any of the first media asset and the second media asset has one or more attributes that correspond to characteristics of any of the first device and the second device.

For example, in some embodiments, the media guidance application may determine, based on a type of the first device, the characteristics of the first device, such as but not limited to a display dimension, a display type, a memory volume, ownership information (e.g., whether the account associated with the first device is subject to any parental control rules, etc.) and a network connection, and/or the like. The media guidance application may determine whether one or more attributes from the first set of attributes correspond to the characteristics based on one or more pre-defined association relationships. For example, the pre-defined association relationship may specify that a high-definition media asset is to be displayed at a television device, instead of a handheld mobile device. In response to determining that the one or more attributes from the first set of attributes correspond to the characteristics based on one or more pre-defined association relationships, the media guidance application may append the first indication of the first device to metadata corresponding to the first media asset.

For another example, in some embodiments, the media guidance application may determine a viewing pattern involving the first device from viewing history from the user profile. The viewing pattern includes a parameter such as but not limited to a media asset type, a media quality, a media asset title, a media asset genre, a media asset source, a media asset length, and/or the like. The media guidance application may then determine whether one or more attributes from the first set of attributes correspond to the parameter from the viewing pattern, e.g., the same media asset source, etc.

In response to determining that the first media asset has attributes from the first set of attributes that correspond to characteristics of the first device and the second media asset has attributes from the second set of attributes that correspond to characteristics of the second device, the media guidance application may store the first media asset at the first storage device, and transfer the second media asset from the first storage device to a second storage device (e.g., a user tablet computer. For example, the media guidance application may store a high-definition copy of the same media asset that has a large file size at a personal video recorder, and transmit a standard-definition copy that has a relatively smaller file size to another device such as a mobile device, a tablet computer, and/or the like.

In some embodiments, the media guidance application may store both the first media asset with a first indication of the first device and the second media asset with a second indication of the second device. The media guidance application may generate, for simultaneous display, a first indication of the first media asset and the second media asset with a second indication of the second media asset. For example, when a user searches for a title of the media asset, the media guidance application may present an icon noting a previously recorded high-definition version, and another icon noting a previously recorded standard-definition version. The first visual indication is selectable to playback the first media asset at the first device, and the second visual indication is selectable to playback the second media asset at the second device.

In some embodiments, the media guidance application may automatically recommended a media asset that is different from the user requested media asset based on the available copies. For example, after storing both the first media asset with a first indication of the first device and the second media asset with a second indication of the second device, the media guidance application may receive a user request to playback the second media asset at user equipment corresponding to the first storage device, and the user request includes identifying information relating to the second media asset. For example, the user may request to playback a standard-definition copy on a television set, while a high-definition copy is available. The media guidance application may determine a recommendation confidence level to playback the first media asset instead of the second media asset at the user equipment in response to the user request. For example, the media guidance application may retrieve the similarity metric between the first media asset and the second media asset, and determine a difference score by comparing the identifying information corresponding to the second media asset with the first set of attributes corresponding to the first media asset. For example, the difference score indicates whether and how much the identifying information of the user requested media asset differs from the first media asset intended for recommendation. The media guidance application may then determine the recommendation confidence level by subtracting the difference score from the similarity metric.

In response to determining that the recommendation confidence level is greater than a pre-defined recommendation confidence threshold, the media guidance application may transmit the first media asset to the first device, instead of the second media asset that is identified in the user request. In response to determining that the recommendation confidence level is less than a pre-defined recommendation confidence threshold, the media guidance application may generate, for display, a visual element indicative of a recommendation of the first media asset to be transmitted to the first device. For example, when the user asks for a previously stored media asset recorded from a certain channel but the same media asset recorded from a different channel with higher definition is available, the media guidance application may recommend the copy with a higher definition to the user.

In some embodiments, the media guidance application may inspect whether storing any of the first media asset and the second media asset violates any configuration rules, e.g., parental control, etc. For example, the media guidance application may retrieve, from a user profile, a set of media asset configuration rules including at least one or more restrictions on the first device to receive a media asset. The media guidance application may determine whether storing the first media asset on the first storage device exceeds any rule from the set of media asset configuration rules. In response to determining that storing the first media asset on the first storage device exceeds a rule from the set of media asset configuration rules, the media guidance application may cause the first media asset to be transferred from the first storage device to the second storage device.

In some embodiments, the media guidance application may store, at the first storage device of the first user device, the first media asset having a first media asset identifier transmitted from a first media source, and store, at the first storage device of the first device, the second media asset having a second media asset identifier transmitted from a second media source. The second media asset identifier may be different from the first media asset identifier. In response to determining that the first media asset and the second media asset correspond to the same media content, the media guidance application may retrieve a first attribute from the first set of attributes corresponding to the first media asset and a second attribute from the second set of attributes corresponding to the second media asset. Both the first attribute and the second attribute relate to a characteristic of the first device. The media guidance application may determine a first matching level indicative of whether the first attribute is consistent with the first characteristic of the first device based on one or more pre-defined criteria, e.g., whether the screen dimension, definition type, and/or the like of the first media asset matches those of the first device. Similarly, the media guidance application may determine a second matching level indicative of whether the second attribute is consistent with the first characteristic of the first device based on the one or more pre-defined criteria. The media guidance application may compare the first matching level with the second matching level. In response to the comparing, the media guidance application may keep one of the first media asset and the second media asset with a higher matching level at the first storage device of the first device. The media guidance application may then transmit a query, on the information relating to one or more user devices corresponding to a user profile, based on the respective attribute corresponding to one of the first media asset and the second media asset with a lower matching level. In response to the query, the media guidance application may identify the second device having a second characteristic that is consistent with the second attribute based on the one or more pre-defined criteria. The media guidance application may then transmit, to the second storage device of the second device, the second media asset, and in turn remove the second media asset from the first storage device of the first device.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
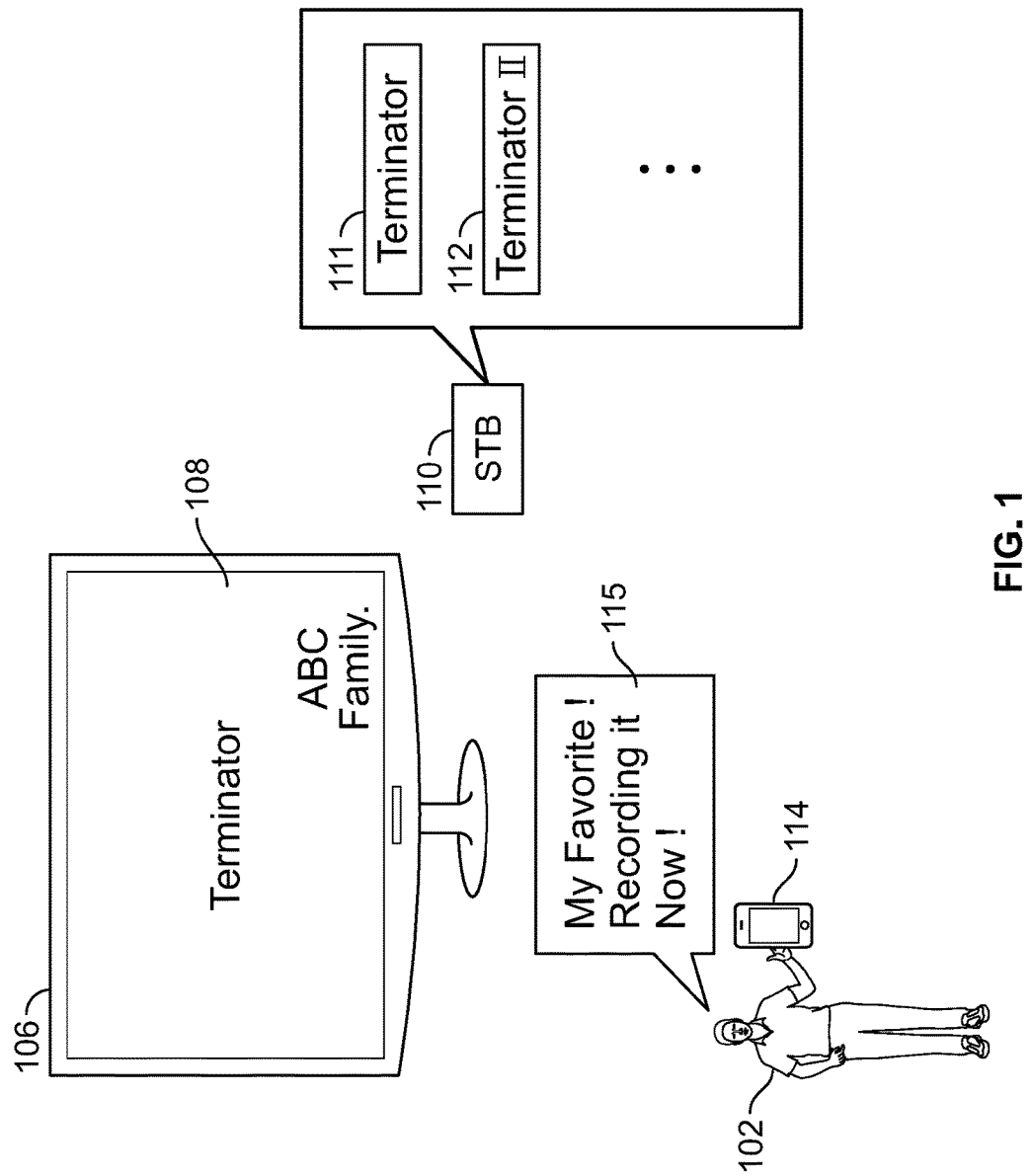
FIG. 1 depicts an illustrative diagram for recording and detecting duplicate copies of media assets that correspond to the same media content at the storage device of user equipment, in accordance with some embodiments of the disclosure.

Systems and methods are disclosed herein for detecting duplicate copies of a media asset and saving different duplicate copies at different user devices. Specifically, a media guidance application, implemented at user equipment, may be used to record or store media assets from different media sources. When each recorded or stored media asset is assigned with a unique media asset identifier, the media guidance application may detect media assets that are duplicate copies of the same media program, e.g., a television show, a sports game, a movie, etc., by comparing various attributes of the media asset, e.g., the media asset title, the media asset description, the casting member list corresponding to the media asset, the media asset episode index, the media asset season index, a set of media asset frames, the media asset digital signature, and/or the like. For example, when two media assets having two distinct media asset identifiers (e.g., as the two media assets are recorded from different channels and may be interleaved with different commercial sessions, etc.) share the same title, the same director name, the same actor and actress list, and the same episode index, the two media assets may likely be related to the same media program. After detecting duplicate copies of the same media program, the media guidance application may determine whether to store the two media assets that are duplicate copies, or to delete one of the duplicate copies, or to transmit one of the duplicate copies for storage at a different user device. For example, the media guidance application may keep the duplicate copies as different versions of the same movies at a personal digital recorder, e.g., a high-definition version, a standard-definition version, an editor-special version, and/or the like. For another example, if the media guidance application has determined that the user usually chooses to watch a high-definition version, the media guidance application may automatically delete the standard-definition version. For another example, the media guidance application may determine that one of the duplicate copies is an edited family-friendly version, and may then deliver the respective media asset to a user device, e.g., a tablet owned by a minor in the household.

In some embodiments, to determine whether to delete, and which one of the two media assets that are duplicate copies of the same media program, the media guidance application may evaluate how confident it is to automatically delete a duplicate copy. For example, the media guidance application may evaluate a confidence level of any action taken towards to one of the duplicate copies, e.g., to delete the copy, or to offload the copy to a different device, etc. The confidence level combines a metric that evaluates how similar the two media assets are, and a metric that indicates how and whether one of the two media assets is to be deleted in similar past scenarios. For example, if any recorded media assets from the ABC Family channel is played on a user tablet, then the media guidance application may have a high confidence level to deliver a duplicate copy of media asset recorded from the same channel to the tablet.

As referred to herein, the term "media source" refers to any data source that provides a media asset that can be transmitted for recording or storage at user equipment. For example, a media source may include, but not limited to, a television network channel, an Internet television channel, an online streaming channel, an on-demand source, an over-the-top (OTT) source, any service provider, and/or the like. As referred to herein, the term "attribute" refers to the value of a specification parameter. As used herein, the term "attribute type" refers to the name of the specification parameter corresponding to the respective attribute. For example, an attribute type of a media asset may include, but not limited to a media asset title, a media asset duration, a media asset description, a media asset cast member list, media asset soundtrack information, a media asset production company name, a media asset production year, a set of media asset frames, a media asset digital signature, and/or the like. Accordingly, an attribute corresponding to the movie "Terminator" may include, but not limited to the title "Terminator," the duration of 117 minutes, the director name "James Cameron," the actor name "Schwarzenegger," the production year of 1984, and/or the like.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media. Computer-readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

It is to be noted that embodiments described herein may be implemented by a media guidance application, or any other data search and analysis tool that is configured to access a databased of previously stored files.

With the advent of the Internet, mobile computing, and high-speed wireless networks, users are accessing media on user equipment devices on which they traditionally did not use. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters" or providers" logos, etc.), media format (e.g., standard definition, high definition, 3D, etc.), on-demand information, blogs, websites, and any other type of guidance data that is helpful for a user to navigate among and locate desired content selections.

As referred to herein, the term "in response to" refers to initiated as a result of. For example, a first action being performed in response to a second action may include interstitial steps between the first action and the second action. As referred to herein, the term "directly in response to" refers to caused by. For example, a first action being performed directly in response to a second action may not include interstitial steps between the first action and the second action.

FIG. 1 depicts an illustrative diagram 100 for recording and detecting duplicate copies of media assets that correspond to the same media content at the storage device of user equipment or at a cloud server, in accordance with some embodiments of the disclosure. Diagram 100 shows a user 102 operating a user device 114, user equipment 106 which may be integrated with, or include a set-top box with a local storage device 110. The set-top box may be configured to implement a media guidance application. At the user equipment 106, one or more media assets 108 may be played, and may be recorded by the media guidance application by transmitting the media asset 108 for storage at the storage device 110. In another example, the storage device 110 may represent a cloud storage device that is located at a cloud server, e.g., see data source 716 that is accessible via communications network 714 in FIG. 7. The media assets 111 and 112 may thus be recorded by the media guidance application and stored at the cloud server.

For example, the storage device 110 may include a plurality of previously stored media assets, including but not limited to a "Terminator" movie 111 having a high definition recorded from the HBO channel, a sequel of the "Terminator" movie 112, and/or the like. In diagram 100, the user 102 may send a request to record a media asset, e.g., by a voice command 115, or by configuring a recording schedule via a user interface on the user device 114, etc. Thus, after the recording, the media asset (e.g., 108) may be stored at the storage device 110, e.g., either locally or at a cloud server.

The media guidance application may then determine whether any of the recorded media assets include duplicate copies. For example, the media guidance application may examine the stored media assets within the storage 110 when a new media asset is received, or may determine whether a media asset scheduled for recording (but prior to recording) may be a duplicate copy of an existing media asset already stored at the storage 110. Specifically, the media guidance application may identify a first media asset in a database of media assets previously stored on a first storage device. For example, the media guidance application may record and/or identify a newly recorded movie "Terminator" 108 from the ABC family channel at the storage device 110.

To determine whether the recorded movie "Terminator" already exists in the storage device 110, the media guidance application may utilize the attributes of the movie 108. Specifically, the media guidance application may determine a first set of attributes corresponding to the first media asset, e.g., movie "Terminator" from the ABC family channel. For example, in some embodiments, the media guidance application may retrieve metadata corresponding to the first media asset (e.g., the recorded movie "Terminator" from the ABC Family channel), and a list of pre-defined attribute types, such as but not limited to an English title corresponding to the first media asset, a title in a foreign language corresponding to the first media asset an index corresponding to the media asset, a description of the media asset, an actor name corresponding to the media asset, a director name corresponding to the media asset, a display resolution parameter corresponding to the media asset, a media asset length, a user rating, a set of media asset frames, a media asset digital signature, and a media asset rating corresponding to the media asset, and/or the like. For each pre-defined attribute type from the list of pre-defined attribute types, the media guidance application may parse the metadata to extract data corresponding to the pre-defined attribute type. For example, the media guidance application may generate a set of attributes corresponding to the movie "Terminator" 108 recorded from the ABC Family channel in an example eXtensible Markup Language (XML) file:

<media_asset>
   <id> 3fst82342 </id>
   <source> "ABC family" </source>
   <record_time> 10:23 </record_time>
   <title> "Terminator" </title>
   <description> "terminator . . . " </description>
   <actor> "Arnold Schwarzenegger" </actor>
   <director> "James Cameron" </director>
   <screen_size> 1024×768 </screen_size>
   <definition> standard </definition>
   <rating> R</rating>
   . . .
</media_asset>

The media guidance application may then find whether any previously stored media asset matches the attributes for the first media asset. Specifically, the media guidance application may search for a second media asset that has a matching attribute with one or more of the first set of attributes, e.g., sending a query based on one or more of the attributes to the storage device 110 where the movie "Terminator" 111 and the movie "Terminator II" 112 are stored. In response to the transmitted query based on the one or more attributes from the first set of attributes, the media guidance application may detect a second media asset that has matching attributes with the one or more attributes and a second set of attributes corresponding to the second media asset. For example, the media guidance application may identify that both the movie "Terminator" 111 and the movie "Terminator II" 112 have a few matching attributes with the movie "Terminator" 108, e.g., the same title, the same director name, the same actor name, and/or the like.

To determine whether any of the media assets 111 and 112 corresponds to the same media content with the media asset 108, the media guidance application may quantitatively determine how much the media assets share in common. Specifically, the media guidance application may compare the first set of attributes corresponding to the first media asset with the second set of attributes corresponding to the second media asset to generate a similarity metric between the first media asset and the second media asset. For example, in some embodiments, for each attribute from the first set of attributes (e.g., a media title of "Terminator," a production year of "1984," and a director name of "James Cameron," etc.), the media guidance application may form a query on the second set of attributes (e.g., attributes corresponding to the movie "Terminator" 111 recorded from the HBO channel) based on the respective attribute. The media guidance application may determine, for each attribute, whether a respective matching attribute that overlaps with the respective attribute for more than a pre-defined threshold is identified within the second set of attributes. For example, the attribute of media asset title "Terminator" for the movie 108 fully overlaps with the media asset title "Terminator" for the movie 111. For another example, the media asset length of "127 minutes" for the movie 108 is within a close range with the media asset length of "117 minutes" for the movie 111, and may be considered as overlapping more than a pre-defined threshold (e.g., 80%, 75%, etc.). In response to determining that the respective matching attribute that overlaps with the respective attribute for more than the pre-defined threshold is identified within the second set of attributes, the media guidance application may compute a respective overlap percentage that the respective attributes from the first set of attributes overlap with the respective matching attributes from the second set of attributes. For example, the media asset 108 and the media asset 111 have a 100% overlap in media asset title (both are "Terminator"), and have a 92% overlap in media asset length, and/or the like.

In some embodiments, the media guidance application may compare attributes of different data formats. For example, the same attribute type, e.g., media asset episode index, may be represented in different data formats in the first set and the second set of attributes, e.g., "S03-E05" (season three episode five), "E25" (the $25^{th}$ episode, which may be the same as the fifth episode in season three). Specifically, the media guidance application may retrieve a first attribute having a first data format from the first set of attributes and a second attribute having a second data format from the second set of attributes. The media guidance application may translate, via a lookup table specifying variations of data formats corresponding to each attribute type, the first attribute having the first data format to the second data format, and then compare the translated first attribute with the second attribute. For example, the media guidance application may retrieve the attribute type of media asset episode index for the first media asset as "S03-E05" (e.g., season-number-episode-number) and may then retrieve other data formats (e.g., episode number out of all episodes across seasons) corresponding to the attribute type for media asset episode index. The media guidance application may then form a query to a data source (e.g., see 718 in FIG. 7) to retrieve information about the episode index based on the media asset title, and determine that the episode index in the form of "E25" (the $25^{th}$ episode of all episodes) is the same as "S03-E05."

After the media guidance application has computed an overlap percentage between a pair of overlapping attributes from the first set of attributes and the second set of attributes, the media guidance application may determine the similarity metric between the first media asset and the second media asset. Specifically, the media guidance application may compute a weighted sum over all overlap percentages between the retrieved attributes and their respective matching attributes. Each overlap percentage is weighted by a pre-defined weight corresponding to a type of the respective attribute. For example, the media asset title, the media asset season index, the media asset episode index, and/or the like may be assigned a relatively high weight (e.g., 0.8, 0.9, etc.), as media assets having a non-overlapping title, season index or episode index are unlikely to correspond to the same media content. For another example, the media asset description may be assigned a relatively lower weight as media assets obtained from different media sources (e.g., channels) may be associated with descriptions written by different editors.

For example, the similarity metric between the media asset 108 and the media asset 111 may be generated based on the following example comparison:

TABLE 1

Example Attribute Comparison

| Attribute Type | Media asset 108 | Media Asset 111 | Overlap Rate | Weight |
|---|---|---|---|---|
| title | Terminator | Terminator | 100% | 0.7 |
| Director name | James Cameron | James Cameron | 100% | 0.7 |
| Actor Name | Schwarzenegger | Schwarzenegger | 100% | 0.7 |
| Description | ~~~~~~~ | ~~~~~~~ | 65% | 0.45 |
| Length | 117 minutes | 127 minutes | 90% | 0.5 |
| . . . | . . . | . . . | . . . | . . . |

The media guidance application may determine whether the first media asset (e.g., media asset 108) and the second media asset (e.g., media asset 1111) correspond to the same media content based on the similarity metric. For example, the media guidance application may compare whether the similarity metric is greater than a pre-defined similarity threshold (e.g., 0.45, 0.55, etc.).

In some embodiments, the media guidance application may prioritize certain attributes or characterize certain matching attribute matching scenarios to determine whether the first media asset and the second media asset correspond to the same media content. Specifically, the media guidance application may retrieve and apply comparison logic rules, which specify a matching scenario where an attribute match for a first type of attribute and an attribute mismatch for a second type of attribute are identified. For example, the media asset 111 and the media asset 112 may have a relatively high similarity metric, because the two media assets have the same title "Terminator," the same actor name, the same director name, and very similar description. However, the media asset 111 and the media asset 112 have a different production year. In this scenario, even if the two media assets may have a relatively high similarity metric, a comparison logic rule specifies that any two media assets that have different production years do not correspond to the same media content. In another example, a comparison logic rule may specify that any two media assets that have different season or episode indices do not correspond to the same media content. Accordingly, the media guidance application may determine whether attributes of the first type and of second type from the first set of attributes and counterpart attributes of the first type and of second type from the second set of attributes satisfy the matching scenario specified in the comparison logic rule, e.g., different season or episode indices, different production years, etc.

In response to determining that the attributes of the first type and of second type from the first set of attributes and the counterpart attributes of the first type and of second type from the second set of attributes satisfy the matching scenario specified in the comparison logic rule, the media guidance application may apply a comparison result specified in the comparison logic rule that indicates whether the first media asset and the second media asset correspond to the same media content. For example, the movie "Terminator II" 112 and the movie "Terminator" 111 are determined to not be the same movie. In this example, the movie 111 and the movie 112 violate a comparison logic rule as having different production years. Thus, even if the two movies 111 and 112 may have a relatively high similarity metric as sharing similar titles, similar description, the same cast member, the same director name, the same production company, and/or the like, the two movies 111 and 112 are not detected as duplicate copies.

It is noted that embodiments discussed in relation to FIG. 1 may be applied to detecting duplicate copies of the same media content among previously stored media assets at a local storage device or at a cloud server, and then determining which previously stored duplicate copy of the same media content is to be deleted or transferred to a different storage device. Alternatively, the embodiments of detecting duplicate copies may be applied to scenarios when a new media asset is recorded and stored, or before a new media asset is actually stored—the media guidance application may receive a configured recording schedule that includes a set of attributes of the media asset to be recorded, and may then determine whether the media asset to be recorded is a duplicate copy of an existing media asset that has previously been stored. If the media asset that is scheduled to be recorded is determined to be a duplicate copy of an existing media asset that has previously been stored, the media guidance application may determine which copy is to be kept, as further described in relation to FIG. 2. The media asset scheduled to be recorded may be removed from the recording schedule, or the media asset that is previously stored is to be deleted from the storage device. The embodiments of detecting duplicate copies may also be applied to scenarios when the first media asset and the second media asset are both scheduled to be recorded but before any of the two media assets is actually stored on the local or cloud storage device yet. For example, in response to determining that both the first media asset and the second media asset are scheduled to be recorded, the media guidance application may retrieve attributes corresponding to the two media assets, and apply similar embodiments described in FIG. 1 to determine whether the two media assets correspond to duplicate copies of the same media content. If the two media assets that are scheduled to be recorded are determined to be duplicate copies, the media guidance application may determine which media asset is to be kept (e.g., to be recorded as scheduled, while the other media asset is remoted from the recording schedule). The determination of which media asset is to be kept is further described in relation to FIG. 2.

Figure 2:
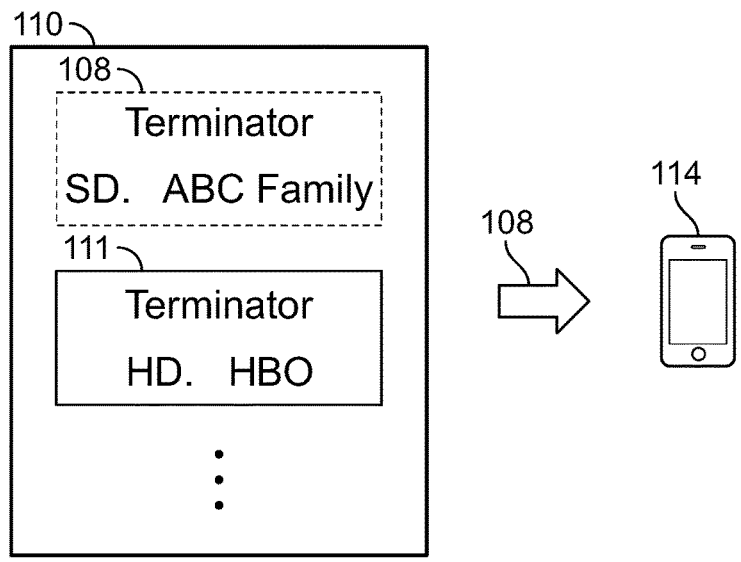
FIG. 2 depicts an illustrative diagram for determining and sending one of the duplicate copies of the same media content for storage at a different user device, in accordance with some embodiments of the disclosure.

FIG. 2 depicts an illustrative diagram 200 for determining and sending one of the duplicate copies of the same media content for storage at a different user device, in accordance with some embodiments of the disclosure. Diagram 200 shows a local storage 110 that stores the movie "Terminator" 108 which is a standard-definition version and recorded from the ABC family channel and the movie "Terminator" 111 which is a high-definition version and recorded from the HBO channel.

After determining that two recorded media assets (e.g., the movie "Terminator" 108 recorded from the ABC family channel and the movie "Terminator" 111 recorded from the HBO channel) correspond to the same media content (e.g., as described in relation to FIG. 1), the media guidance application may determine whether to perform an action against one of the duplicate copies, e.g., to delete one of the duplicate copies, to offload one of the duplicate copies for storage at a different storage device, etc. Specifically, the media guidance application may select an action to perform relative to one of the first media asset and the second media asset based at least in part on the first set of attributes and the second set of attributes.

In some embodiments, the media guidance application may determine which of the duplicate copies to delete or offload from the local storage device 110 based on user preference, e.g., parental control settings, etc. Specifically, the media guidance application may retrieve a set of media asset configuration rules from a user profile, which indicate a preference characteristic of a media asset or a restriction characteristic of a media asset, e.g., the user device 114 may be subjected to parental control rules, or be restricted to store media assets that are larger than a pre-defined size, etc. The media guidance application may then compare the first set of attributes with the set of media asset configuration rules to generate a first compliance score indicative of a first level that the first media asset is compliant with the set of media asset configuration rules. For example, the compliance score may be computed as a percentage of the number of media asset configuration rules that attributes of the first media asset comply with, relative to the total number of media asset configuration rules. Similarly, the media guidance application may compare the second set of attributes with the set of media asset configuration rules to generate a second compliance score indicative of a second level that the second media asset is compliant with the set of media asset configuration rules. In response to determining that the first compliance score is lower than the second compliance score, the media guidance application may select the first media asset for deletion from the local storage device. Or alternatively, the media guidance application may determine whether the first media asset violates a configuration rule, and then cause the first media asset to be transferred from the first storage device to the second storage device. For example, the media asset configuration rules may include a restriction rule that any unedited version of rated R movies is refrained from being played at a user device owned by a minor in the household, and a preference rule that a high-definition version is preferred for playback at the user equipment 106, and/or the like. Thus, in this example, the movie "Terminator" 111, which is an unedited high-definition copy, is compliant with both rules, and is selected to be kept at the local storage device 110. The movie "Terminator" 108, which is an edited family-friendly copy, is then chosen to be deleted or offload to a user device owned by the minor.

Before performing any action relative to a duplicate copy of a media asset, the media guidance application may determine how confident it is to carry out the action, e.g., to remove the duplicate copy from the local storage device without user intervention. Specifically, the media guidance application may determine a confidence level relating to automatically performing the selected action relative to the one of the first media asset and the second media asset by combining the similarity metric (e.g., as described in relation to FIG. 1) and a success metric. The success metric represents a past success rate of incidents when no user correction was received to revert automatic performance of the action. For example, the media guidance application may retrieve a record of previously performed actions and respective media assets that the actions have been previously performed upon, e.g., past actions that delete or transfer a duplicate copy to a different device. The media guidance application may search the record of previously performed actions and media assets that the actions have been previously performed upon based on one or more attributes corresponding to the one of the first media asset and the second media asset. For example, if the movie "Terminator" recorded from the ABC family channel is determined to be the media asset to delete or offload to a different device, the media guidance application may retrieve a record of past occurrences where media assets from the ABC family channel are deleted. The media guidance application may then calculate the success metric as a percentage of successful occurrences among the subset of previously performed actions. In each successful occurrence, no user correction to revert the respective action was requested after the respective action was automatically performed. For example, for each media asset recorded from the ABC family channel and then automatically deleted, if a user requests the media asset after the media asset is automatically deleted, the deletion is considered unsuccessful. If no such request is received after the media asset is automatically deleted, the deletion is considered successful. The media guidance application may then determine the confidence level as a weighted sum of the similarity metric and the success metric using pre-defined weights.

In response to determining that the confidence level is greater than a pre-defined confidence threshold, the media guidance application may automatically perform the determined action relative to the one of the first media asset and the second media asset, e.g., to delete or offload the duplicate copy to a different device. In some embodiments, the media guidance application may choose a duplicate copy to delete based on a user preference. Specifically, the media guidance application may determine a first format (e.g., standard definition, screen size adapted for a mobile screen, etc.) associated with the first media asset (e.g., movie "Terminator" 108) and a second format (e.g., high definition, original screen size for display at a large screen, etc.) associated with the second media asset (e.g., movie "Terminator" 111). The media guidance application may determine that the user has a preference for high definition movies, or that the first media asset with the high definition has a better video content quality compared to the second media asset with a standard definition, and may then automatically set a deletion priority associated with the movie "Terminator" 108 that has a standard definition. Thus, the movie "Terminator" 108 will be deleted before the movie "Terminator" 111.

In some embodiments, the media guidance application may then determine whether the user profile is associated with a different user device that can be used to offload one of the duplicate copies, e.g., from the storage device 110 to user device 114. Specifically, in response to determining that the first media asset and the second media asset correspond to the same media content, the media guidance application may retrieve information relating to one or more user devices corresponding to a user profile. For example, the information relating to each user device that has been registered with the user profile may include, but not limited to a hardware identifier, a user identifier, a type of the user device, make and model of the user device, a display dimension, a display type, a memory volume, ownership information, and a network connection, and/or the like. Example device information retrieved from the user profile in an XML format may take a form similar to the following:

<user_device>
  <device_1>
  <id> JS009 </id>
  <hardware_id> &&DFF&& </hardware_id>
  <model> tablet </model>
  <make> Apple iPad Mini </make>
  <user_info>
    <user_type> personal </user_type>
    <account> shared </account>
    <parental_control> on </parental_control>
    . . .
  </user_info>

```
<display>
    <width> 800 </width>
    <length> 1200 </length>
    <type> touch screen </type>
</display>
<memory>
    <total> 64 GB </total>
    <available> 34 GB </available>
</memory>
<network>
    <network_1> wireless 802.11 </network_1>
    <Bluetooth> on </Bluetooth>
    . . .
</network>
. . .
</device_1>
<device_2>
    . . .
</device_2>
. . .
</user_device>
```

The media guidance application may then compare relevant entries of the device information with attributes of the media assets that have been identified as duplicate copies. Specifically, the media guidance application may determine whether any of the first media asset and the second media asset has one or more attributes that correspond to characteristics of any of the first storage device and the second storage device.

In some embodiments, the media guidance application may determine which, if any, of the duplicate copies has attributes that are consistent with the characteristics of the user device. Specifically, the media guidance application may determine, based on a type of the first storage device or the second storage device, the characteristics of the first device or the second storage device, such as but not limited to a display dimension, a display type, a memory volume, ownership information and a network connection, and/or the like. The media guidance application may then determine whether one or more attributes from the first set of attributes correspond to the characteristics based on one or more pre-defined association relationships. For example, the pre-defined association relationships may include criteria that correlate device characteristics with media asset attributes, e.g., an attribute of "standard definition" is correlated with a characteristic of the memory space of a mobile device, an attribute of "screen adapted for mobile device displays" is correlated with a characteristic of a mobile device, an attribute of "unedited original version" or "rated R" is correlated with a characteristic of "parental control settings on," and/or the like. For example, when the movie "Terminator" 108 recorded from the ABC Family channel, has an attribute of "standard definition," and the movie "Terminator" 111 recorded from the HBO channel has an attribute of "high definition," the media guidance application may determine that movie 111 with the high definition is to be stored at the storage device 110 to be played at the user equipment 106, while the standard definition movie 108 may be delivered and stored on a tablet computer.

In some embodiments, the media guidance application may determine whether to offload one of the duplicate copies to another user device based on the past viewing pattern of the user. Specifically, the media guidance application may determine a viewing pattern involving the first device from viewing history from the user profile. For example, the viewing pattern may indicate that media assets under certain categories (e.g., teen, comedian, shows recorded from family friendly channels such as "Disney" or "ABC Family," etc.) are often played at a tablet computer, e.g., by a minor in the household. For another example, the viewing pattern may indicate that a high-definition copy of a media asset is usually kept at the storage device 110 and played at the user equipment 106.

In some embodiment, the media guidance application may identify parameters from the viewing pattern such as but not limited to a media asset type, a media quality, a media asset title, a media asset genre, a media asset source, a media asset length, and/or the like, and the corresponding user device. The media guidance application may then determine whether one or more attributes from the first set of attributes correspond to the parameters from the viewing pattern. For example, if the viewing pattern indicates that media assets recorded from the ABC family channel are usually played on a table computer (e.g., user device 114), the media guidance application may determine that the media asset 108 is intended for storage at the user device 114.

In some embodiments, the media guidance application may determine whether a duplicate copy violates any configuration rules of a local storage device, e.g., parental control settings, etc. Specifically, the media guidance application may retrieve, from a user profile, a set of media asset configuration rules including at least one or more restrictions on the first storage device to store a media asset, e.g., the user device 114 may be subjected to parental control rules, or be restricted to store media assets that are larger than a pre-defined size, etc. The media guidance application may then determine whether storing the first media asset on the first storage device exceeds any rule from the set of media asset configuration rules. In response to determining that storing the first media asset on the first storage device exceeds a rule from the set of media asset configuration rules, the media guidance application may cause the first media asset to be transferred from the first storage device to the second storage device. For example, when the movie "Terminator" 108 violates a parental control rule associated with the local storage device 110, the movie "Terminator" 108 is transmitted to a private user device 114 that is owned by an adult in the household.

In response to determining a match between one or more attributes from the first set of attributes and the characteristics of the first device, or based on a viewing pattern, the media guidance application may associate a duplicate copy of a media asset with a specific device. Specifically, the media guidance application may append the first indication of the first device to metadata corresponding to the first media asset. For example, the media guidance application may add a data field of user_device to the profile of the media asset, indicating that the respective media asset is assigned to a particular user device.

The media guidance application may then store or transmit the duplicate copies of the media asset at the local storage device, or to a different storage device. For example, the media guidance application may store the high definition copy 111 of the movie "Terminator" at the storage device 110, and transmit the standard-definition copy 108 of the movie "Terminator" to another device 114 such as a mobile device, a tablet computer, and/or the like. For another example, the media guidance application may transmit the edited version 108 of the movie "Terminator" to the user device 114 that is intended for a minor in the household, while keeping the original unedited version of the rated R movie "Terminator" at the storage device 110. As shown in FIG. 2, after the movie "Terminator" 108 is transferred to the user device 114, the media guidance application may no longer display an indication of "Terminator" 108, or display the indication of "Terminator" 108 with a visual effect, e.g., shaded, grayed-out, etc.

In some embodiments, as shown in FIG. 2, the removed media asset 108 may be displayed in a shaded or grayed-out pattern, but may still be selectable by a user to request playback. For example, if the media asset 108 has been offloaded to user device 114, but the user requests the media asset 108 to be displayed at user equipment 106, the media asset 108 may be restored at the storage device 110 for playback. For another example, if the media asset 108 has been determined to be deleted, the deletion may be implemented through a recycle bin so that if the user requests the media asset 108 to be displayed at user equipment 106, the media asset 108 may be restored from the recycle bin. If the media asset 108 has been stored at the recycle bin for a period of time (e.g., one week, two weeks, etc.) without any user request to restore, the media asset 108 may be permanently removed from the recycle bin.

It is noted that embodiments described in FIGS. 1-2 describe detecting whether two media assets are duplicate copies of the same media content, and determining which one of the two media assets is to be deleted or transferred to another storage device, for illustrative purpose. Similar embodiments can be applied to a plurality of media assets, not limited to two media assets, e.g., three, four, five, and/or the like. For example, the media guidance application may compare a plurality of sets of attributes corresponding to the plurality of media assets, in a similar manner as described in the scenario of two media assets, to determine whether the plurality of media assets are duplicate copies.

Figure 3:
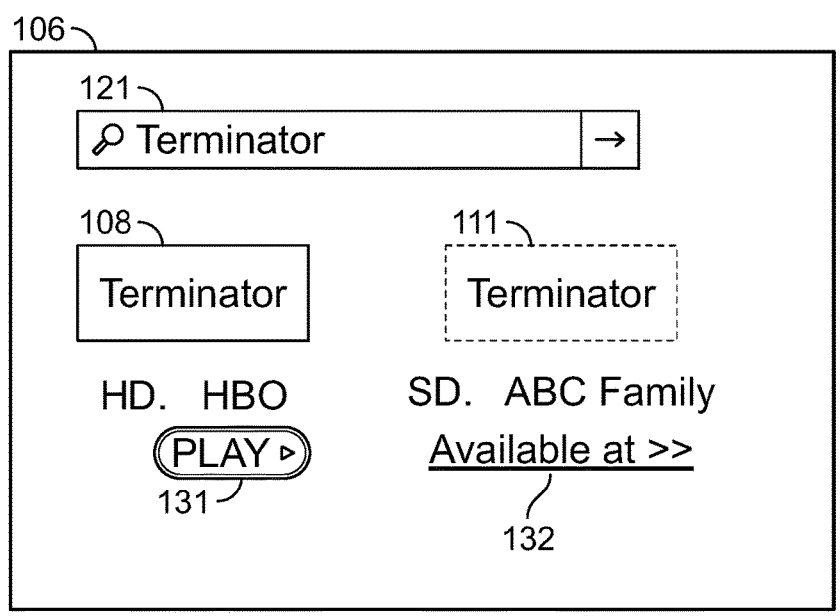
FIG. 3 depicts an illustrative diagram for generating, for display, indications of the duplicate copies at the user equipment and the availability of each duplicate copy, in accordance with some embodiments of the disclosure.

FIG. 3 depicts an illustrative diagram 300 for generating, for display, indications of the duplicate copies at the user equipment and the availability of each duplicate copy, in accordance with some embodiments of the disclosure. Diagram 300 shows at the user equipment 106, two duplicate copies of "Terminator" movie 108 and "Terminator" movie 111 are displayed simultaneously in response to a search query based on the keyword "Terminator" 121.

Specifically, after storing both the first media asset (e.g., "Terminator" 111) with a first indication of the first storage device (e.g., local storage device 110) and the second media asset (e.g., "Terminator" 108) with a second indication of the second storage device (e.g., user device 114), the media guidance application may generate, for simultaneous display, the first media asset with the first indication of the first device and the second media asset with the second indication of the second storage device. For example, when a query based on the keyword "Terminator" is received in the database of previously stored media assets, two visual indications, e.g., icons of "Terminator" movie 108 and "Terminator" movie 111, are displayed simultaneously. The first visual indication is selectable to playback the first media asset at the first device, and the second visual indication is selectable to playback the second media asset at the second device. For example, when the high-definition copy of "Terminator" 108 is stored at the local storage device 110 corresponding to the set-top box, a "play" button 131 is displayed to playback on the user equipment 106. When the standard-definition copy of "Terminator" 108 is no longer stored at the local storage device 110, e.g., either deleted or transferred to the user device 114, an indication of "available at" 132 is displayed for selection to direct a user to watch "Terminator" 108 at user device 114.

In some embodiments, the duplicate copies corresponding to different versions of the same media program may be kept in storage for user selection. Specifically, the media guidance application may store both the first media asset with a first indication of the first device and the second media asset with a second indication of the second device. For example, both the movie "Terminator" 108 recorded from the ABC family channel and the movie "Terminator" 111 recorded from the HBO channel can be stored at the storage device 110.

In some embodiments, the media guidance application may automatically adjust a user inquiry for a media asset based on the available copies, e.g., by providing the media asset of a different version than the one specified in the user inquiry. Specifically, the media guidance application may receive a user request to playback the second media asset at user equipment corresponding to the first storage device, and the user request includes identifying information relating to the second media asset. For example, the user request may be received, e.g., via a voice command, at the user equipment 106, asking for "the Terminator movie I recorded yesterday." The media guidance application may perform a query on previously stored media assets based on the identifying information (e.g., title "Terminator" and recording time "yesterday") to identify the media asset 108 that is recorded from "ABC family." The media guidance application may also determine that a duplicate copy of the movie "Terminator" 111 that has a high definition for playback at the user equipment 106 is available.

The media guidance application may determine whether to recommend a different copy of the same media content to the user other than the copy that the user requested. Specifically, the media guidance application may determine a recommendation confidence level to playback the first media asset instead of the second media asset at the user equipment in response to the user request. For example, the media guidance application may retrieve the similarity metric between the first media asset (e.g., the movie "Terminator" 108) and the second media asset (e.g., the movie "Terminator" 111), and incorporate the similarity metric as part of the recommendation level. The media guidance application may also determine a difference score, which indicates whether and how much the identifying information of the user requested media asset differs from the first media asset intended for recommendation. For example, the media guidance application may compare the identifying information in the user request, e.g., a title of "Terminator," a recording time of "yesterday," corresponding to the second media asset, with the first set of attributes corresponding to the first media asset (e.g., movie "Terminator" 111), e.g., a title of "Terminator," a recording time of "two weeks ago." Thus, in this example, the difference between the identifying information corresponding to the second media asset and attributes corresponding to the first media asset is the recording time. The media guidance application may use a pre-defined difference score associated with the attribute type "recording time." When the difference between the identifying information corresponding to the second media asset and attributes corresponding to the first media asset includes two or more attribute types, a weighted sum of the difference score per each attribute type is calculated. The media guidance application may then determine the recommendation confidence level by subtracting the difference score from the similarity metric. Thus, when the similarity metric is high, e.g., indicating the movie "Terminator" 108 and the movie "Terminator" 111 are substantially similar, the recommendation confidence level is high. However, if the difference score is high, e.g., indicating the user request is substantially different from the media asset intended for recommendation, the recommendation confidence level is relatively lower.

In response to determining that the recommendation confidence level is greater than a pre-defined recommendation confidence threshold, the media guidance application may play back the first media asset at the user equipment. For example, in response to the user request to playback the "Terminator" movie 108 at the user equipment 106, the media guidance application may playback the high-definition version 111 of "Terminator" at the user equipment 106 instead. In response to determining that the recommendation confidence level is less than a pre-defined recommendation confidence threshold, the media guidance application may generate, for display, a visual element indicative of a recommendation of the first media asset to be played at the user equipment. For example, when the user asks for a previously stored media asset recorded from a certain channel but the same media asset recorded from a different channel with higher definition is available, the media guidance application may recommend the copy with higher-definition to the user.

In some embodiments, the media guidance application may inspect whether the recommendation of a media asset to a user other than the user requested copy violates any configuration rules, e.g., parental control settings, etc. If a media asset intended for recommendation that is different from the user requested media asset violates a media asset configuration rule, the media guidance application may refrain from recommending the media asset. In the above example, if the local storage device 111 is subject to parental control rules to playback unedited version of any rated R movies, the movie "Terminator" 111, despite the high-definition quality, will not be recommended for playback. Instead, the movie "Terminator" 108, which is a family friendly version recorded from "ABC family," will be played.

Figure 4:
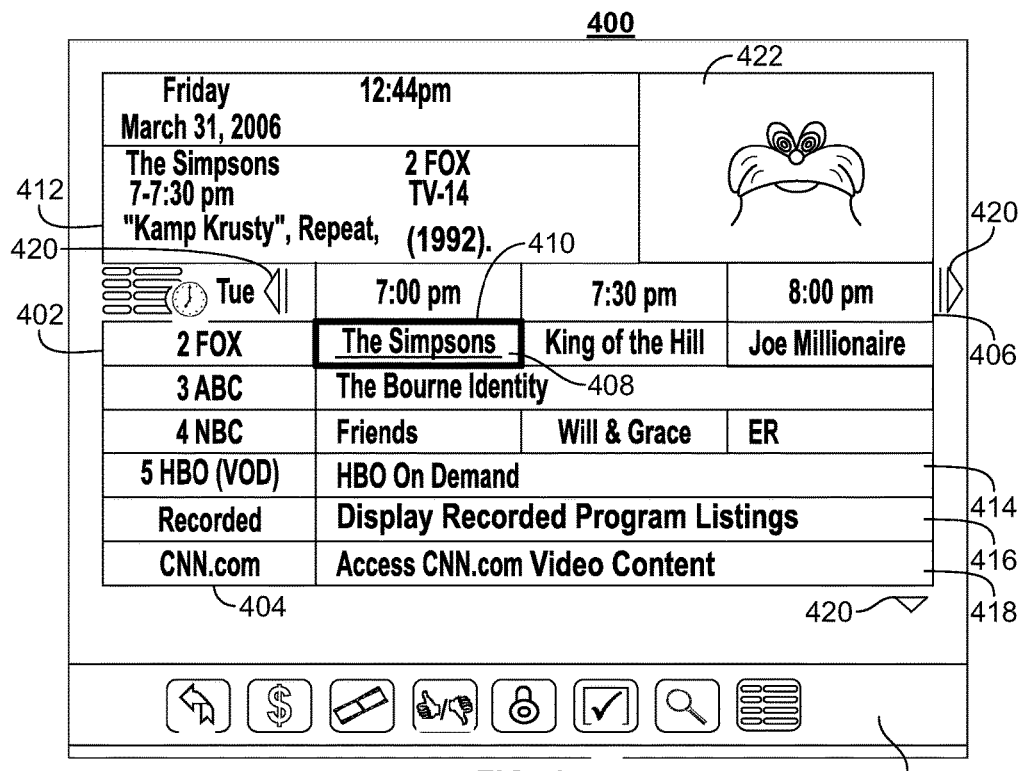
FIG. 4 shows an illustrative embodiment of a display screen that may be used to provide media guidance application listings and other media guidance information, in accordance with some embodiments of the disclosure.
Figure 5:
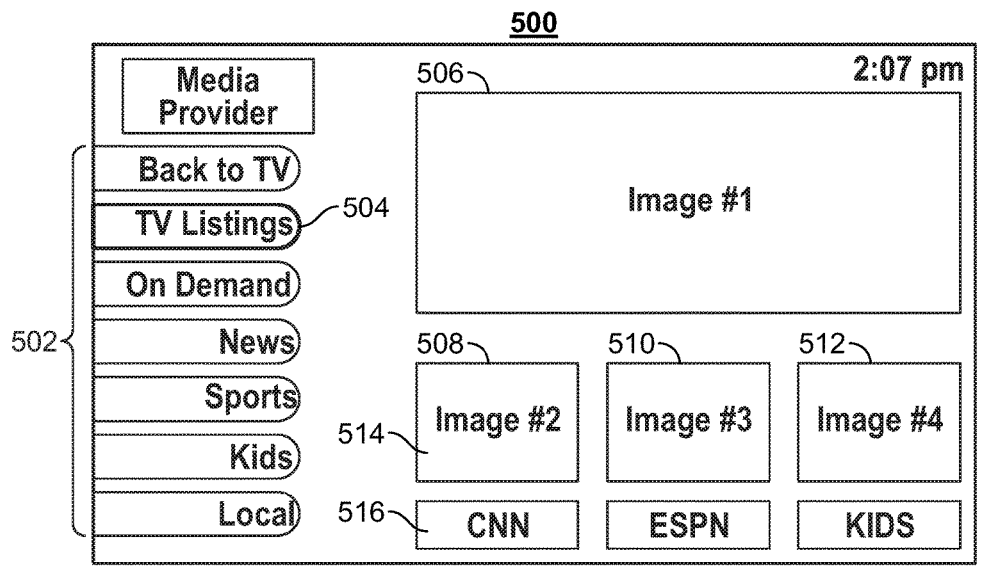
FIG. 5 shows another illustrative embodiment of a display screen that may be used to provide media guidance application listings, in accordance with some embodiments of the disclosure.

FIGS. 4-5 show illustrative display screens that may be used to provide media guidance data. The display screens shown in FIGS. 4-5 may be implemented on any suitable user equipment device or platform, e.g., user equipment 106 in FIG. 1. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 4003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 4D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 31, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
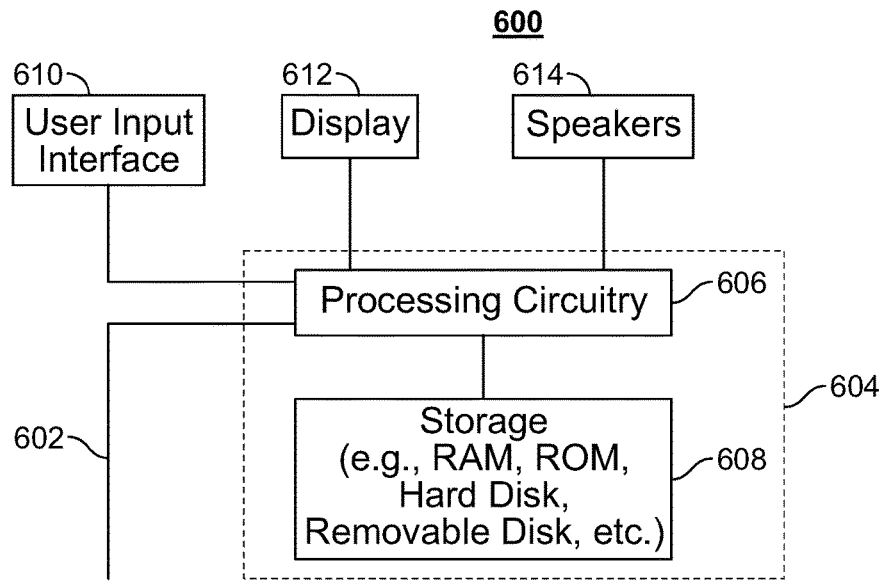
FIG. 6 is a block diagram of an illustrative user equipment (UE) device in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 500 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 506) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 708 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content.

The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 500, the tuning and encoding circuitry (including multiple tuners) may be associated with storage 508.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
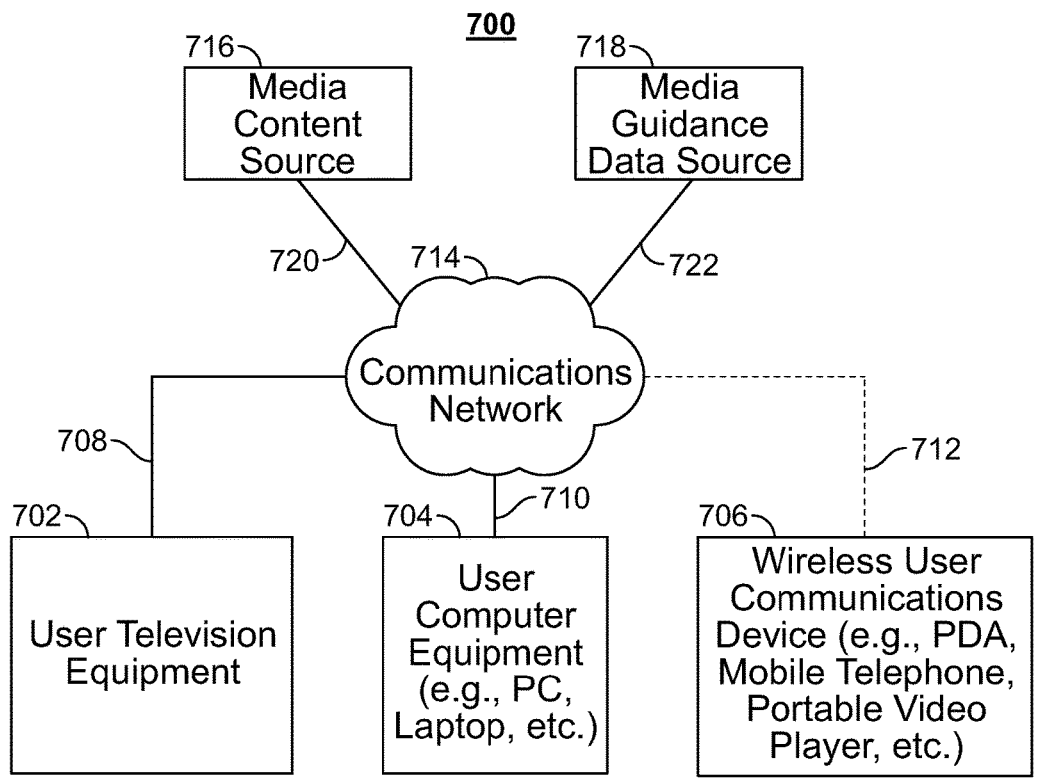
FIG. 7 is a block diagram of an illustrative media system in accordance with some embodiments of the disclosure.

User equipment device 700 of FIG. 7 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users" equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 508, and executed by control circuitry 704 of a user equipment device 500. In some embodiments, media guidance applications may be client-server applications where only a client application resides on the user equipment device, and server application resides on a remote server. For example, media guidance applications may be implemented partially as a client application on control circuitry 704 of user equipment device 500 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 7.

Figure 8:
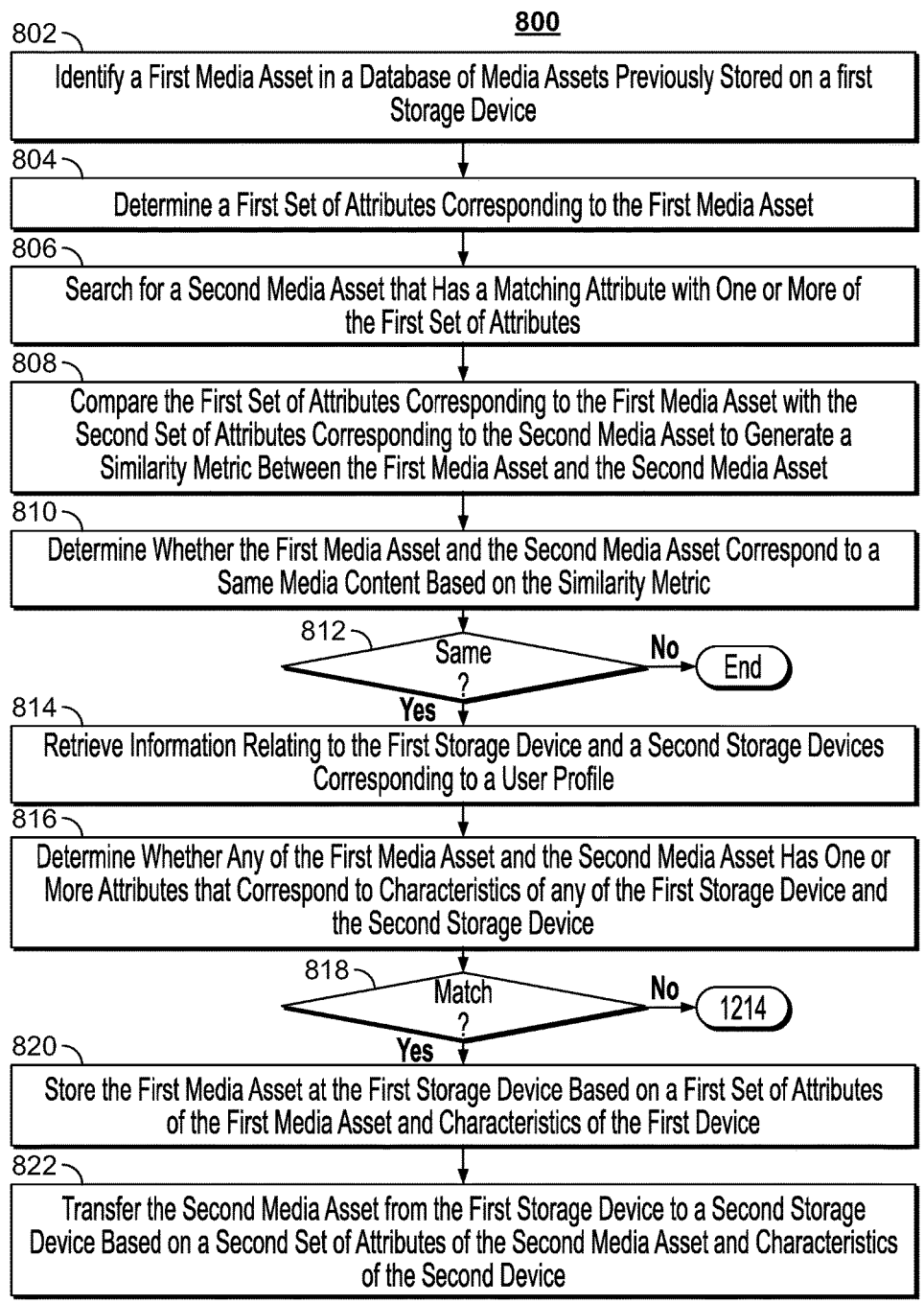
FIG. 8 depicts an illustrative flowchart of a process for detecting duplicate copies of a media asset and saving different duplicate copies at different user devices, in accordance with some embodiments of the disclosure.

FIG. 8 depicts an illustrative flowchart of a process for detecting duplicate copies of a media asset and saving different duplicate copies at different user devices, in accordance with some embodiments of the disclosure. Process 800 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 800 begins at 802, where control circuitry 604 identifies a first media asset in a database of media assets previously stored on a first storage device, e.g., by reading the first media asset out of local storage 608 in FIG. 6, or data source 716 in FIG. 7. At 804, control circuitry 604 determines a first set of attributes corresponding to the first media asset. For example, control circuitry 604 parses the metadata corresponding to the first media asset and extracts data fields such as but not limited to a title in a foreign language corresponding to the first media asset, an index corresponding to the media asset, a description of the media asset, an actor name corresponding to the media asset, a director name corresponding to the media asset, a display resolution parameter corresponding to the media asset, a media asset length, a user rating, and a media asset rating corresponding to the media asset, and/or the like. At 806, control circuitry 604 searches for a second media asset that has a matching attribute with one or more of the first set of attributes. For example, control circuitry 604 transmits a query based on one of the attributes on the database of previously stored media assets. At 808, control circuitry 604 compares the first set of attributes corresponding to the first media asset with the second set of attributes corresponding to the second media asset to generate a similarity metric between the first media asset and the second media asset, and then at 810, control circuitry 604 determines whether the first media asset and the second media asset correspond to the same media content based on the similarity metric. The similarity metric calculation and determination at 808 and 810 are further described in relation to process 1000 in FIG. 10.

At 812, process 800 ends when the first media asset and the second media asset do not correspond to a same media content based on the similarity metric. At 8012, process 800 proceeds to 814 when the first media asset and the second media asset correspond to the same media content based on the similarity metric. At 814, control circuitry 604 retrieves information (e.g., a type of the storage device, available memory volume, the display type corresponding to the storage device, etc.) relating to the first storage device and a second storage devices corresponding to a user profile, e.g., from local storage 608 in FIG. 6, or data source 718 in FIG. 7. For example, the first storage device corresponds to the local storage at user equipment, and the second storage device corresponds to the storage unit at a user mobile device.

At 816, control circuitry 604 determines whether any of the first media asset and the second media asset has one or more attributes (e.g., a display format, etc.) that correspond to characteristics (e.g., a display type, etc.) of any of the first storage device and the second storage device. At 818, process 800 proceeds to 1214 in FIG. 12 when none of the first media asset and the second media asset has attributes that correspond to characteristics of any of the first storage device and the second storage device. For example, as further described at 1214 in FIG. 12, control circuitry 604 determines whether to delete one of the first media asset and the second media asset. At 818, process 800 proceeds to 820 when the first media asset has attributes that correspond to characteristics of the first storage device. At 802, control circuitry 604 stores the first media asset at the first storage device, e.g., when the first media asset is a high-definition version that has a large media file size, and the first storage device is a personal video recorder. At 822, control circuitry 604 transfers the second media asset from the first storage device to a second storage device (e.g., via communications network 714 in FIG. 7), e.g., when the second media asset is an adapted version intended to be played at a mobile device, and the second storage device is associated with a user mobile device.

Figure 9:
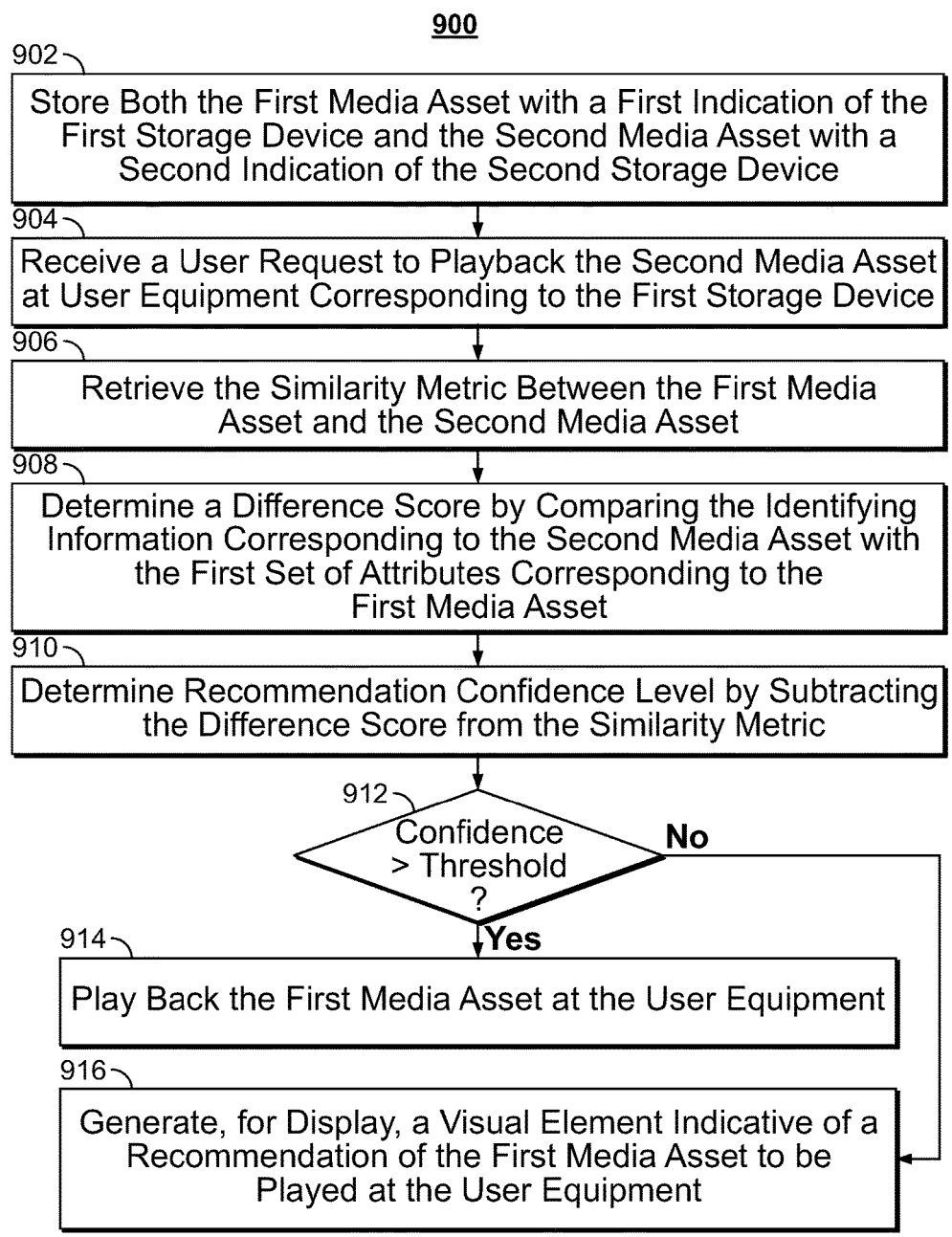
FIG. 9 depicts an illustrative flowchart of a process for recommending a copy of a media asset for playback at a user device after detecting different duplicate copies of the media asset are available, in accordance with some embodiments of the disclosure.

FIG. 9 depicts an illustrative flowchart of a process for recommending a copy of a media asset for playback at a user device after detecting different duplicate copies of the media asset are available at 812 in FIG. 8, in accordance with some embodiments of the disclosure. Process 900 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 900 begins at 902, where control circuitry 604 stores both the first media asset with a first indication of the first storage device and the second media asset with a second indication of the second storage device. For example, control circuitry 604 stores different versions of duplicate copies of the media asset at storage 608 in FIG. 6 or data source 716 in FIG. 7, e.g., a high-definition version for playback at a large screen and an adapted version for playback at a mobile screen, etc. At 904, control circuitry 604 receives a user request to playback the second media asset at user equipment corresponding to the first storage device, e.g., via I/O path 602 in FIG. 6. At 906, control circuitry 604 retrieves, e.g., from storage 608 in FIG. 6 or data source 718 in FIG. 7, the similarity metric between the first media asset and the second media asset, which is obtained at 808 in FIG. 8 and further described in FIG. 10. At 908, control circuitry 604 determines a difference score by comparing the identifying information corresponding to the second media asset with the first set of attributes corresponding to the first media asset. For example, control circuitry 604 parses the user request to obtain identifying information relating to the second media asset (e.g., "Terminator recorded yesterday," etc.) and determines how different the identifying information is from attributes of the first media asset (e.g., the first media asset is recorded a week ago, but the recording time is not considered a significant difference, so the difference score can be insignificant), as described in relation to FIG. 2. At 910, control circuitry 604 determines a recommendation confidence level by subtracting the difference score from the similarity metric. At 912, process 900 proceeds to 914 when the confidence level is greater than a pre-defined confidence threshold, or proceeds to 916 when the confidence level is less than a pre-defined confidence threshold.

Figure 10:
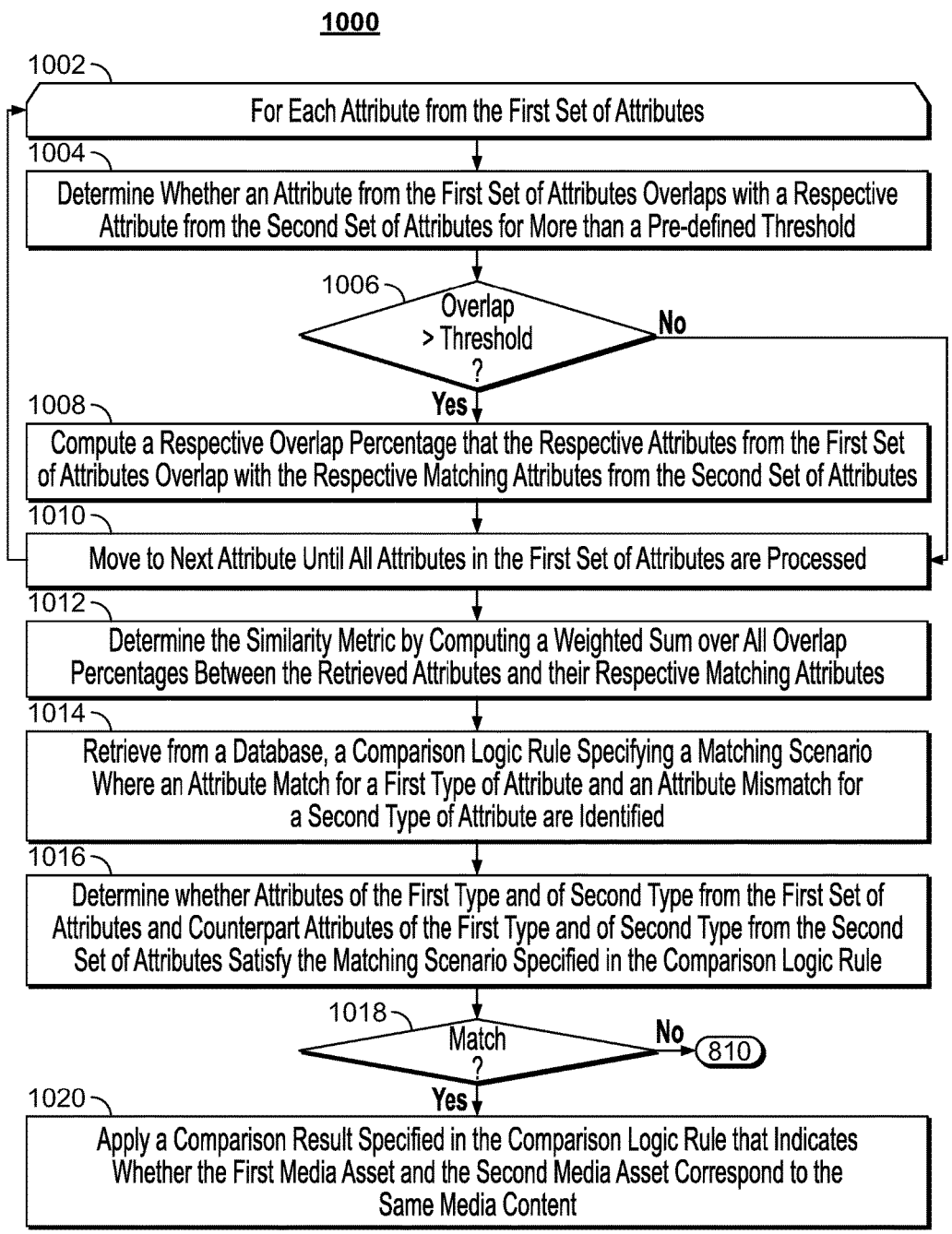
FIG. 10 depicts an illustrative flowchart of a process for determining whether two media assets correspond to the same media content, in accordance with some embodiments of the disclosure.

At 914, control circuitry 604 plays back the first media asset at the user equipment, e.g., via the display 412 in FIG. 4, or any of 702, 704 and 706 in FIG. 7. At 916, control circuitry 604 generates, for display, e.g., via the display 412 in FIG. 4, or any of 702, 704 and 706 in FIG. 7, or a user interface of user device 114 in FIG. 1, a visual element indicative of a recommendation of the first media asset to be played at the user equipment FIG. 10 depicts an illustrative flowchart of a process for determining whether two media assets correspond to the same media content (e.g., 810 in FIG. 8), in accordance with some embodiments of the disclosure. Process 1000 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1000 begins at 1002, where control circuitry 604 starts with retrieving each attribute from the first set of attributes, e.g., from storage 608 in FIG. 6, or data source 718 in FIG. 7. At 1004, control circuitry 604 determines whether an attribute from the first set of attributes overlaps with a respective attribute from the second set of attributes for more than a pre-defined threshold. For example, control circuitry 604 compares the data values of the same attribute type, e.g., media asset title, and determines a percentage that the text titles of the two media assets overlap. At 1006, process 1000 proceeds to 1008 when the respective attribute from the first set of attributes overlaps with a respective attribute from the second set of attributes for more than the pre-defined threshold. Or at 1006, process 1000 proceeds to 1010 when the respective attribute from the first set of attributes does not overlap with a respective attribute from the second set of attributes for more than the pre-defined threshold.

At 1008, control circuitry 604 computes a respective overlap percentage that the respective attributes from the first set of attributes overlap with the respective matching attributes from the second set of attributes. At 1010, control circuitry 604 moves to the next attribute (and repeats 1002-1008) until all attributes in the first set of attributes are processed.

At 1012, control circuitry 604 determines the similarity metric by computing a weighted sum over all overlap percentages between the retrieved attributes and their respective matching attributes. For example, control circuitry 604 retrieves pre-determined weights for each attribute types from storage 608 in FIG. 6, or data source 718 in FIG. 7, e.g., a weight of 0.8 for "media asset title," a weight of 0.3 for "media asset description," and/or the like.

At 1014, control circuitry 604 retrieves, from a database at storage 608 in FIG. 6, or data source 718 in FIG. 7, a comparison logic rule specifying a matching scenario where an attribute match for a first type of attribute and an attribute mismatch for a second type of attribute are identified. At 1016, control circuitry 604 determines whether attributes of the first type and of second type from the first set of attributes and counterpart attributes of the first type and of second type from the second set of attributes satisfy the matching scenario specified in the comparison logic rule. For example, control circuitry 604 verifies whether the first media asset and the second media asset matches with a pre-defined scenario, e.g., when two media assets have the same title, the same cast list, but different production year, etc. At 1018, process 1000 proceeds to 810 in FIG. 8 when the first media asset and the second media asset do not satisfy the matching scenario specified in the comparison logic rule. Or process 1000 proceeds to 1020 when the first media asset and the second media asset satisfy the matching scenario specified in the comparison logic rule.

At 1020, control circuitry 604 applies a comparison result specified in the comparison logic rule that indicates whether the first media asset and the second media asset correspond to the same media content. For example, control circuitry 604 parses and reads the comparison result from the comparison logic rule, e.g., "not same" in response to the matching scenario of "same title," "same cast list," and "different production years."

Figure 11:
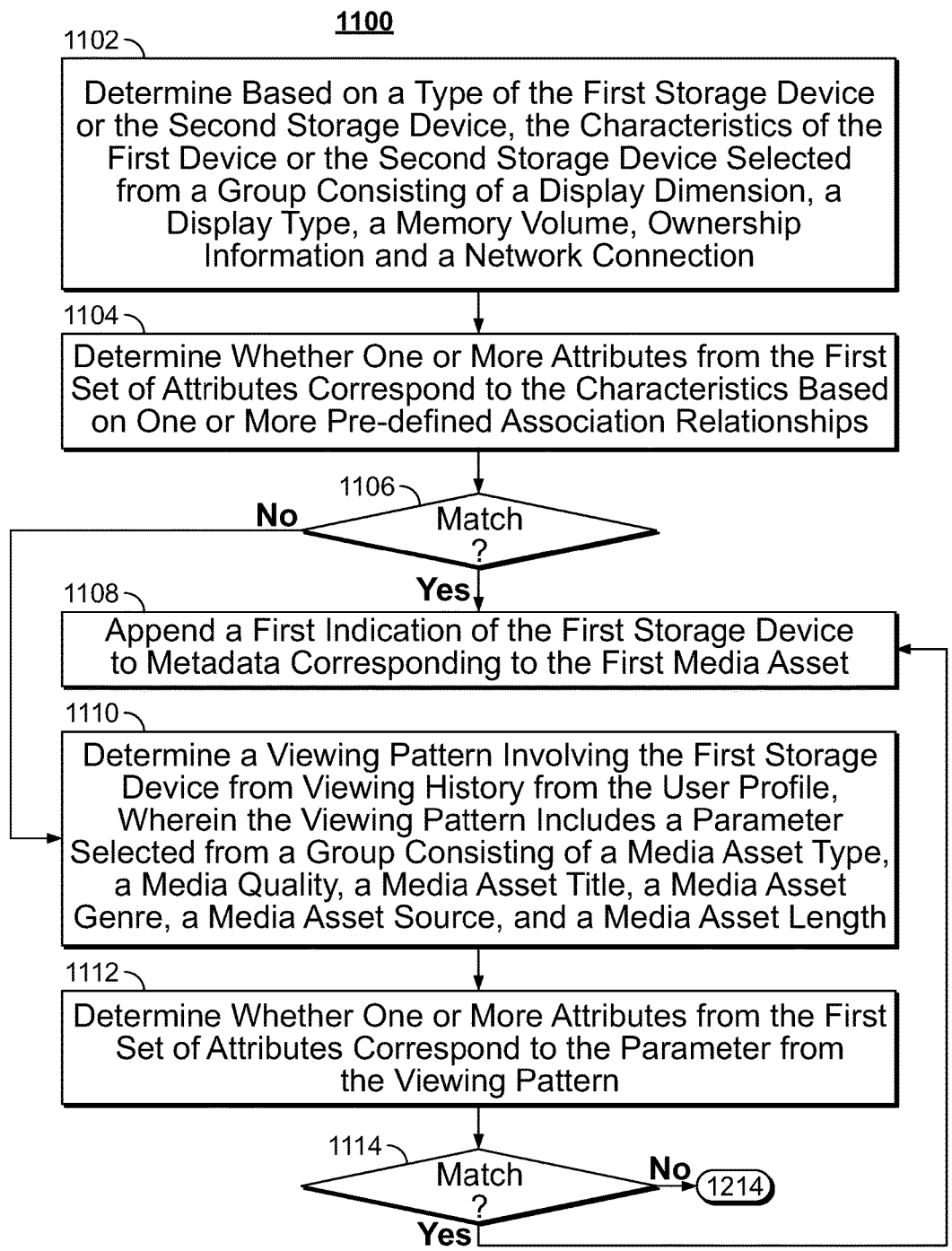
FIG. 11 depicts an illustrative flowchart of a process for determining whether any of the duplicate copies of media assets corresponds to one of the storage devices from a user profile, in accordance with some embodiments of the disclosure.

FIG. 11 depicts an illustrative flowchart of a process for determining whether any of the duplicate copies of media assets corresponds to one of the storage devices from a user profile (e.g., see 816 in FIG. 8), in accordance with some embodiments of the disclosure. Process 1000 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1100 begins at 1102, where control circuitry 604 determines, based on a type of the first storage device or the second storage device (e.g., personal video recorder, or mobile device, etc.), the characteristics of the first device or the second storage device, such as but not limited to a display dimension, a display type, a memory volume, ownership information and a network connection. For example, control circuitry 604 identifies a hardware identifier from the first storage device, e.g., a tablet computer, and then searches at a database of user devices for characteristics corresponding to the tablet computer. At 1104, control circuitry 604 determines whether one or more attributes from the first set of attributes correspond to the characteristics based on one or more pre-defined association relationships. For example, when control circuitry 604 retrieves an attribute of media file size or definition of the media asset, control circuitry 604 in turn compares the media file size with the memory volume of the first storage device. A large media file size does not match with a limited memory space, e.g., at a mobile device. At 1106, process 1100 proceeds to 1110. if no attribute from the first set of attributes correspond to the characteristics of any storage device. Or process 1100 proceeds to 1108 if one or more attributes from the first set of attributes correspond to the characteristics of the first storage device.

At 1108, control circuitry 604 appends a first indication of the first storage device to metadata corresponding to the first media asset. For example, control circuitry 604 writes a data entry including an identifier of the first storage device to the metadata. At 1110, control circuitry 604 determines a viewing pattern involving the first storage device from viewing history from the user profile. For example, the viewing pattern includes a parameter such as a media asset type, a media quality, a media asset title, a media asset genre, a media asset source, a media asset length, and/or the like. At 1112, control circuitry 604 determines whether one or more attributes from the first set of attributes correspond to the parameter from the viewing pattern. At 1114, process 1100 proceeds to 1214 in FIG. 12 where control circuitry 604 determines whether to delete the first media asset if no attribute from the first set of attributes corresponds to the parameter from the viewing pattern. Or, process 1100 proceeds to 1108 when attribute from the first set of attributes corresponds to the parameter from the viewing pattern.

Figure 12:
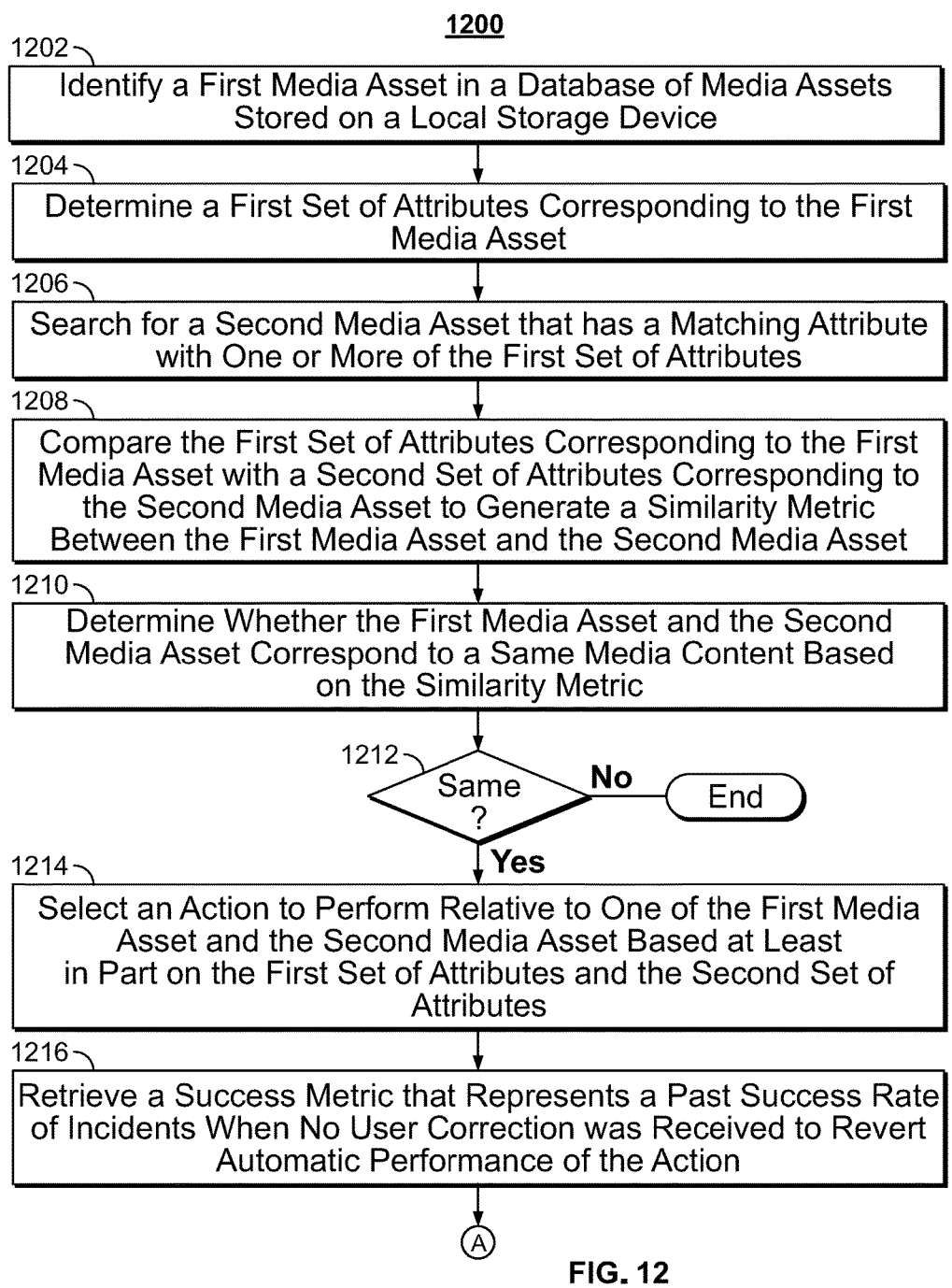
FIG. 12 depicts an illustrative flowchart of additional embodiments relating to performing an action relative to a duplicate copy of a media asset, in accordance with some embodiments of the disclosure.
Figure 12:
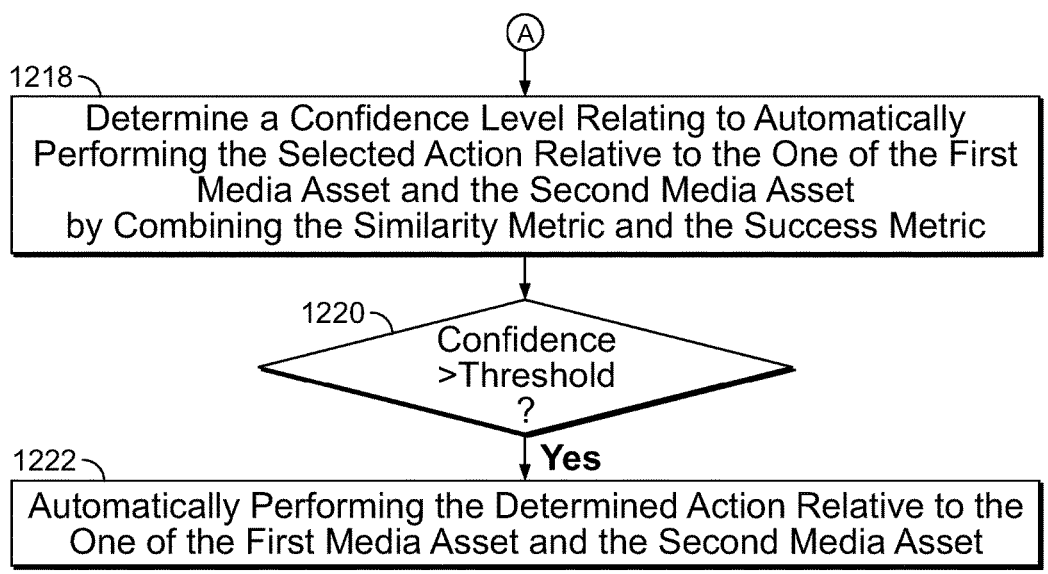

FIG. 12 depicts an illustrative flowchart of additional embodiments relating to performing an action relative to a duplicate copy of a media asset, in accordance with some embodiments of the disclosure. Process 1200 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1200 begins at 1202, where control circuitry 604 identifies a first media asset in a database of media assets stored on a local storage device, e.g., similar to 802 in FIG. 8. At 1204, control circuitry 604 determines a first set of attributes corresponding to the first media asset, e.g., similar to 804 in FIG. 8. At 1206, control circuitry 604 searches for a second media asset that has a matching attribute with one or more of the first set of attributes, e.g., similar to 806 in FIG. 8. At 1208, control circuitry 604 compares the first set of attributes corresponding to the first media asset with a second set of attributes corresponding to the second media asset to generate a similarity metric between the first media asset and the second media asset, e.g., similar to 808 in FIG. 8. At 1210, control circuitry 604 determines whether the first media asset and the second media asset correspond to the same media content based on the similarity metric, e.g., similar to 810 in FIG. 8.

At 1212, process 1200 process to 1214 when the first media asset and the second media asset correspond to the same media content based on the similarity metric. At 1214, control circuitry 604 selects an action to perform relative to one of the first media asset and the second media asset based at least in part on the first set of attributes and the second set of attributes. For example, control circuitry 604 determines whether one of the first media asset and the second media asset is to be transferred to a different storage device, as described in FIG. 11. Or control circuitry 604 determines whether to delete one of the first media asset and the second media asset. At 1216, control circuitry 604 retrieves a success metric that represents a past success rate of incidents when no user correction was received to revert automatic performance of the action, as further described in FIG. 14. At 1218, control circuitry 604 determines a confidence level relating to automatically performing the selected action relative to the one of the first media asset and the second media asset by combining the similarity metric and the success metric, as further described in FIG. 14. For example, the confidence level indicates whether control circuitry 604 is able to perform an action, e.g., to transfer a recorded media asset or to delete a recorded media asset without user intervention.

At 1220, process 1200 proceeds to 1222 when the confidence level is greater than a pre-defined confidence threshold. At 1222, control circuitry 604 automatically performs the determined action relative to the one of the first media asset and the second media asset.

Figure 13:
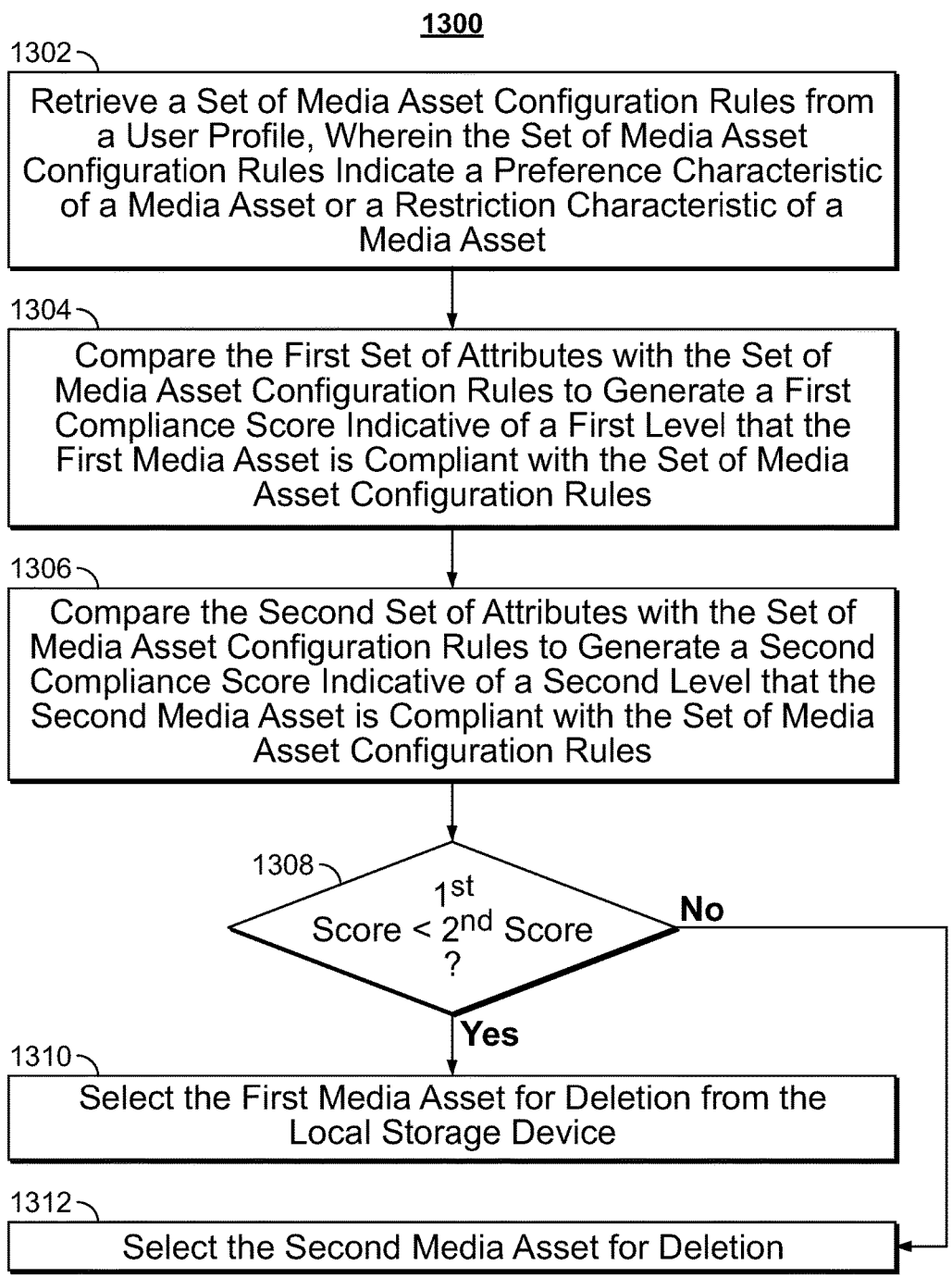
FIG. 13 depicts an illustrative flowchart of additional embodiments relating to selecting an action to perform relative to one of the duplicate copies of the media asset, in accordance with some embodiments of the disclosure.

FIG. 13 depicts an illustrative flowchart of additional embodiments relating to selecting an action to perform relative to one of the duplicate copies of the media asset (e.g., see 1214 in FIG. 12), in accordance with some embodiments of the disclosure. Process 1300 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1300 begins at 1302, where control circuitry 604 retrieves a set of media asset configuration rules from a user profile stored at storage 608 in FIG. 6, or data source 718 in FIG. 7. For example, the set of media asset configuration rules indicate a preference characteristic (e.g., user preferences, etc.) of a media asset or a restriction characteristic (e.g., parental control, etc.) of a media asset. At 1304, control circuitry 604 compares the first set of attributes with the set of media asset configuration rules to generate a first compliance score indicative of a first level that the first media asset is compliant with the set of media asset configuration rules. For example, control circuitry 604 compares the attributes of the first media asset against each media asset configuration rule, and counts the number of media asset configuration rules that the media asset does not violate. Similarly, at 1306, control circuitry 604 compares the second set of attributes with the set of media asset configuration rules to generate a second compliance score indicative of a second level that the second media asset is compliant with the set of media asset configuration rules. At 1308, if the first compliance score is less than the second compliance score, process 1300 proceeds to 1310, where control circuitry 604 selects the first media asset for deletion from the local storage device. Or at 1308, if the first compliance score is greater than the second compliance score, process 1300 proceeds to 1312, where control circuitry 604 selects the second media asset for deletion from the local storage device.

Figure 14:
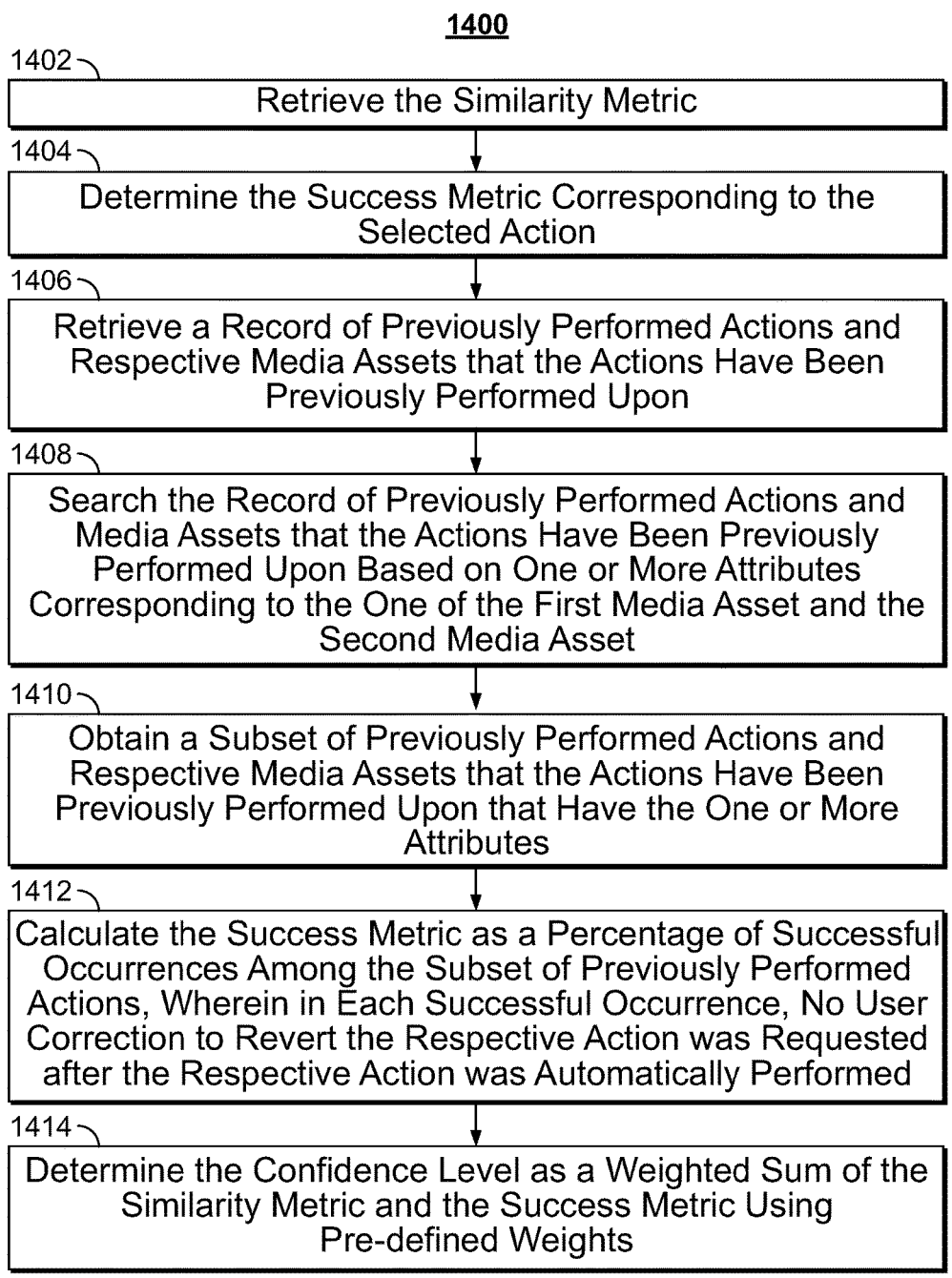
FIG. 14 depicts an illustrative flowchart of additional embodiments relating to determining a confidence level relating to automatically performing an action relative to a duplicate copy of a media asset, in accordance with some embodiments of the disclosure.

FIG. 14 depicts an illustrative flowchart of additional embodiments relating to determining a confidence level relating to automatically performing an action relative to a duplicate copy of a media asset (e.g., see 1218 in FIG. 12), in accordance with some embodiments of the disclosure. Process 1400 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1400 begins at 1402, where control circuitry 604 retrieves the similarity metric, e.g., from storage 608 in FIG. 6 or data source 718 in FIG. 7. At 1404, control circuitry 604 determines the success metric corresponding to the selected action, and the success metric evaluates a success rate of performing the selected action without any user request to revert the action. For example, at 1406, control circuitry 604 retrieves, e.g., from storage 608 in FIG. 6 or data source 718 in FIG. 7, a record of previously performed actions and respective media assets that the actions have been previously performed upon. At 1408, control circuitry 604 searches the record of previously performed actions and media assets that the actions have been previously performed upon based on one or more attributes corresponding to the one of the first media asset and the second media asset. For example, control circuitry 604 performs a query on the record of previously performed actions based on an action type of "deletion" and a media source of the ABC Family channel. At 1410, control circuitry 604 obtains a subset of previously performed actions and respective media assets that the actions have been previously performed upon that have the one or more attributes, e.g., the record of media assets recorded from the ABC family channel that have been automatically deleted. At 1412, control circuitry 604 calculates the success metric as a percentage of successful occurrences among the subset of previously performed actions. In each successful occurrence, no user correction to revert the respective action was requested after the respective action was automatically performed. For example, for each media asset recorded from the ABC family channel and then automatically deleted, if a user requests the media asset after the media asset is automatically deleted, the deletion is considered unsuccessful. If no such request is received after the media asset is automatically deleted, the deletion is considered successful. At 1414, control circuitry 604 determines the confidence level as a weighted sum of the similarity metric and the success metric using pre-defined weights.

Figure 15:
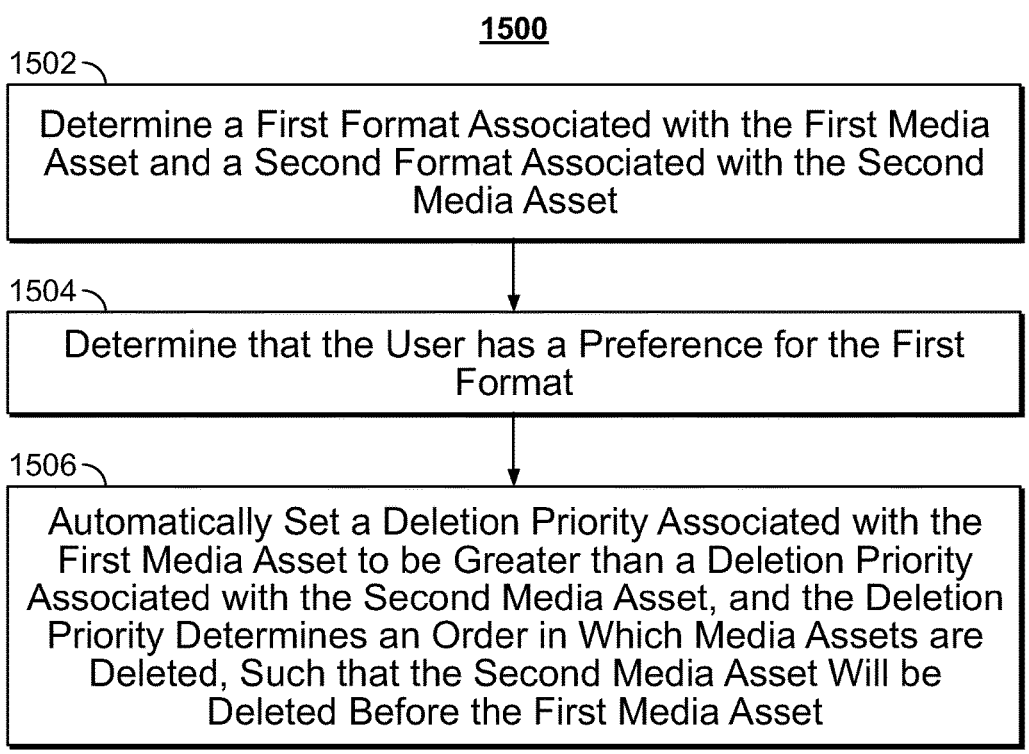
FIG. 15 depicts an illustrative flowchart of additional embodiments relating to determining which one of the duplicate copies of the media assets is to be automatically deleted, in accordance with some embodiments of the disclosure.

FIG. 15 depicts an illustrative flowchart of additional embodiments relating to determining which one of the duplicate copies of the media assets is to automatically deleted, in accordance with some embodiments of the disclosure. Process 1500 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1500 begins at 1502, where control circuitry 604 determines a first format associated with the first media asset and a second format associated with the second media asset. For example, control circuitry 604 parses the metadata corresponding to the media asset to obtain a display dimension or definition of the media asset. At 1504, control circuitry 604 determines that the user has a preference for the first format. For example, control circuitry 604 retrieves a user viewing history from a user profile at storage 608 in FIG. 6 or data source 718 in FIG. 7, and identifies that the user constantly selects a high-definition copy over a standard-definition copy. AT 1506, control circuitry 604 automatically sets a deletion priority associated with the first media asset to be greater than a deletion priority associated with the second media asset. For example, the deletion priority determines an order in which media assets are deleted, such that the second media asset will be deleted before the first media asset.

It should be noted that processes 800-1500 or any step thereof could be performed on, or provided by, any of the devices shown in, or described with respect to, FIGS. 1 and 5-6. For example, any of processes 800-1500 may be executed by control circuitry 604 (FIG. 6) as instructed by control circuitry implemented on user equipment 106 (FIG. 1), 602, 604, 606 (FIG. 6), and/or the like for generating and displaying a summary view of a media asset. In addition, one or more steps of processes 800-1500 may be incorporated into or combined with one or more steps of any other process or embodiment.

It is contemplated that the actions or descriptions of each of FIGS. 8-15 may be used with any other embodiment of this disclosure. In addition, the actions and descriptions described in relation to FIGS. 8-15 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-7 could be used to perform one or more of the actions in FIGS. 8-15.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, calculating a confidence level to determine whether to automatically delete a duplicate copy of a media asset, e.g., by processing circuitry 606 of FIG. 6. The processing circuitry, for instance, may be a general purpose processor, a customized integrated circuit (e.g., an ASIC), or a field-programmable gate array (FPGA) within user equipment 600, media content source 716, or media guidance data source 718. For example, the attributes of media assets, may be stored in, and retrieved from, storage 608 of FIG. 6, or media guidance data source 718 of FIG. 7. Furthermore, processing circuitry, or a computer program, may update configuration data of the media guidance application, which may be stored within storage 608 of FIG. 6 or media guidance data source 718 of FIG. 7.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for detecting duplicate copies of a media asset and saving different duplicate copies at different user devices, respectively, the method comprising:
   identifying a first media asset in a database of media assets previously stored on a first storage device;
   determining a first set of attributes corresponding to the first media asset;
   searching for a second media asset that has a matching attribute with one or more of the first set of attributes;
   comparing the first set of attributes corresponding to the first media asset with a second set of attributes corresponding to the second media asset to generate a similarity metric between the first media asset and the second media asset;
   determining whether the first media asset and the second media asset correspond to a same media content based on the similarity metric;
   in response to determining that the first media asset and the second media asset correspond to the same media content:
      retrieving information relating to the first storage device and a second storage device corresponding to a user profile;
      determining whether any of the first media asset and the second media asset has one or more attributes that correspond to characteristics of any of the first storage device and the second storage device;
      in response to determining that the first media asset has attributes from the first set of attributes that correspond to characteristics of the first storage device and the second media asset has attributes from the second set of attributes that correspond to characteristics of the second storage device:
         storing the first media asset at the first storage device based on a first set of attributes of the first media asset and characteristics of the first storage device; and
         transferring the second media asset from the first storage device to a second storage device based on a second set of attributes of the second media asset and characteristics of the second storage device.

2. The method of claim 1, wherein the determining whether any of the first media asset and the second media asset has one or more attributes that correspond to characteristics of any of the first storage device and the second storage device comprises:
   determining, based on a type of the first storage device or the second storage device, the characteristics of the first storage device or the second storage device selected from a group consisting of a display dimension, a display type, a memory volume, ownership information and a network connection;
   determining whether one or more attributes from the first set of attributes correspond to the characteristics based on one or more pre-defined association relationships; and
   in response to determining that the one or more attributes from the first set of attributes correspond to the characteristics based on one or more pre-defined association relationships, appending a first indication of the first storage device to metadata corresponding to the first media asset.

3. The method of claim 1, wherein the determining whether any of the first media asset and the second media asset has one or more attributes that correspond to characteristics of any of the first storage device and the second storage device comprises:
   determining a viewing pattern involving the first storage device from viewing history from the user profile, wherein the viewing pattern includes a parameter selected from a group consisting of a media asset type, a media quality, a media asset title, a media asset genre, a media asset source, and a media asset length;
   determining whether one or more attributes from the first set of attributes correspond to the parameter from the viewing pattern; and
   in response to determining that the one or more attributes from the first set of attributes correspond to the parameter from the viewing pattern, appending a first indication of the first storage device to metadata corresponding to the first media asset.

4. The method of claim 1, further comprising:
   after storing both the first media asset with a first indication of the first storage device and the second media asset with a second indication of the second storage device:
      generating, for simultaneous display, the first media asset with the first indication of the first storage device and the second media asset with the second indication of the second storage device,
         wherein the first indication is selectable to playback the first media asset at the first storage device, and the second indication is selectable to playback the second media asset at the second storage device.

5. The method of claim 1 further comprising:
   storing both the first media asset with a first indication of the first storage device and the second media asset with a second indication of the second storage device;
   receiving a user request to playback the second media asset at user equipment corresponding to the first storage device,
      wherein the user request includes identifying information relating to the second media asset;

determining a recommendation confidence level to playback the first media asset instead of the second media asset at the user equipment in response to the user request;

in response to determining that the recommendation confidence level is greater than a pre-defined confidence threshold, playing back the first media asset at the user equipment; and in response to determining that the recommendation confidence level is less than a pre-defined confidence threshold, generating, for display, a visual element indicative of a recommendation of the first media asset to be played at the user equipment.

6. The method of claim 5, wherein the determining the recommendation confidence level to provide the first media asset to the first storage device comprises:

retrieving the similarity metric between the first media asset and the second media asset;

determining a difference score by comparing the identifying information relating to the second media asset with the first set of attributes corresponding to the first media asset; and determining the recommendation confidence level by subtracting the difference score from the similarity metric.

7. The method of claim 1, further comprising:

retrieving, from a user profile, a set of media asset configuration rules including at least one or more restrictions on the first storage device to store a media asset;

determining whether storing the first media asset on the first storage device exceeds any rule from the set of media asset configuration rules; and causing the first media asset to be transferred from the first storage device to the second storage device in response to determining that storing the first media asset on the first storage device exceeds a rule from the set of media asset configuration rules.

8. The method of claim 1, wherein the comparing the first set of attributes corresponding to the first media asset with the second set of attributes corresponding to the second media asset comprises:

retrieving a first attribute having a first data format from the first set of attributes and a second attribute having a second data format from the second set of attributes;

translating, via a lookup table specifying variations of data formats corresponding to each attribute type, the first attribute having the first data format to the second data format; and comparing the translated first attribute with the second attribute.

9. The method of claim 1, wherein the comparing the first set of attributes corresponding to the first media asset with the second set of attributes corresponding to the second media asset to generate a similarity metric between the first media asset and the second media asset comprises:

for each attribute from the first set of attributes:
determining whether an attribute from the first set of attributes overlaps with a respective attribute from the second set of attributes for more than a pre-defined threshold; and in response to determining that the respective attributes overlap, computing a respective overlap percentage that the respective attributes from the first set of attributes overlap with the respective matching attributes from the second set of attributes; and determining the similarity metric by computing a weighted sum over all overlap percentages between the attributes from the first set of attributes and their respective matching attributes, wherein each overlap percentage is weighted by a respective pre-defined weight corresponding to a type of the respective attribute;

retrieving, from a database, a comparison logic rule specifying a matching scenario where an attribute match for a first type of attribute and an attribute mismatch for a second type of attribute are identified;

determining whether attributes of the first type and of second type from the first set of attributes and counterpart attributes of the first type and of second type from the second set of attributes satisfy the matching scenario specified in the comparison logic rule; and in response to determining that the attributes of the first type and of second type from the first set of attributes and the counterpart attributes of the first type and of second type from the second set of attributes satisfy the matching scenario specified in the comparison logic rule, applying a comparison result specified in the comparison logic rule that indicates whether the first media asset and the second media asset correspond to the same media content.

10. The method of claim 1, wherein the first storage device is located at a digital video recorder, and the second storage device is located at a mobile device, and the method further comprising:

in response to determining that the first media asset and the second media asset correspond to the same media content:

determining whether one of the first media asset and the second media asset has a display format that is adapted to a first display associated with the mobile device; and in response to determining that the second media asset has the display format that is adapted to the first display associated with the mobile device, transferring the second media asset from the digital video recorder to the mobile device.

11. A system for detecting duplicate copies of a media asset and saving different duplicate copies at different user devices, respectively, the system comprising:

communication circuitry;

processing circuitry configured to:

identify a first media asset in a database of media assets previously stored on a first storage device;

determine a first set of attributes corresponding to the first media asset;

search for a second media asset that has a matching attribute with one or more of the first set of attributes;

compare the first set of attributes corresponding to the first media asset with a second set of attributes corresponding to the second media asset to generate a similarity metric between the first media asset and the second media asset;

determine whether the first media asset and the second media asset correspond to a same media content based on the similarity metric;

in response to determining that the first media asset and the second media asset correspond to the same media content:

retrieve information relating to the first storage device and a second storage device corresponding to a user profile;

determine whether any of the first media asset and
the second media asset has one or more attributes
that correspond to characteristics of any of the first
storage device and the second storage device;
in response to determining that the first media asset
has attributes from the first set of attributes that
correspond to characteristics of the first storage
device and the second media asset has attributes
from the second set of attributes that correspond to
characteristics of the second storage device:
store the first media asset at the first storage device
based on a first set of attributes of the first media
asset and characteristics of the first storage
device; and
transfer, via the communication circuitry, the second media asset from the first storage device to
a second storage device based on a second set of
attributes of the second media asset and characteristics of the second storage device.

12. The system of claim 11, wherein the processing circuitry, when determining whether any of the first media asset and the second media asset has one or more attributes that correspond to characteristics of any of the first storage device and the second storage device, is further configured to:
determine, based on a type of the first storage device or
the second storage device, the characteristics of the first
storage device or the second storage device selected
from a group consisting of a display dimension, a
display type, a memory volume, ownership information
and a network connection;
determine whether one or more attributes from the first set
of attributes correspond to the characteristics based on
one or more pre-defined association relationships; and
in response to determining that the one or more attributes
from the first set of attributes correspond to the characteristics based on one or more pre-defined association
relationships, append a first indication of the first
storage device to metadata corresponding to the first
media asset.

13. The system of claim 11, wherein the processing circuitry, when determining whether any of the first media asset and the second media asset has one or more attributes that correspond to characteristics of any of the first storage device and the second storage device, is further configured to:
determine a viewing pattern involving the first storage
device from viewing history from the user profile,
wherein the viewing pattern includes a parameter
selected from a group consisting of a media asset type,
a media quality, a media asset title, a media asset genre,
a media asset source, and a media asset length;
determine whether one or more attributes from the first set
of attributes correspond to the parameter from the
viewing pattern; and
in response to determining that the one or more attributes
from the first set of attributes correspond to the parameter from the viewing pattern, append a first indication
of the first storage device to metadata corresponding to
the first media asset.

14. The system of claim 11, wherein the processing circuitry is further configured to:
after storing both the first media asset with a first indication of the first storage device and the second media
asset with a second indication of the second storage
device:
generate, for simultaneous display, the first media asset
with the first indication of the first storage device and
the second media asset with the second indication of
the second storage device,
wherein the first indication is selectable to playback
the first media asset at the first storage device, and
the second indication is selectable to playback the
second media asset at the second storage device.

15. The system of claim 11, wherein the processing circuitry is further configured to:
store both the first media asset with a first indication of the
first storage device and the second media asset with a
second indication of the second storage device;
receive a user request to playback the second media asset
at user equipment corresponding to the first storage
device,
wherein the user request includes identifying information relating to the second media asset;
determine a recommendation confidence level to playback the first media asset instead of the second media
asset at the user equipment in response to the user
request;
in response to determining that the recommendation confidence level is greater than a pre-defined confidence
threshold, play back the first media asset at the user
equipment; and
in response to determining that the recommendation confidence level is less than a pre-defined confidence
threshold, generate, for display, a visual element
indicative of a recommendation of the first media asset
to be played at the user equipment.

16. The system of claim 15, wherein the processing circuitry, when determining the recommendation confidence level to provide the first media asset to the first storage device, is further configured to:
retrieve the similarity metric between the first media asset
and the second media asset;
determine a difference score by comparing the identifying
information relating to the second media asset with the
first set of attributes corresponding to the first media
asset; and
determine the recommendation confidence level by subtracting the difference score from the similarity metric.

17. The system of claim 11, wherein the processing circuitry is further configured to:
retrieve, from a user profile, a set of media asset configuration rules including at least one or more restrictions
on the first storage device to store a media asset;
determine whether storing the first media asset on the first
storage device exceeds any rule from the set of media
asset configuration rules; and
cause the first media asset to be transferred from the first
storage device to the second storage device in response
to determining that storing the first media asset on the
first storage device exceeds a rule from the set of media
asset configuration rules.

18. The system of claim 11, wherein the processing circuitry, when comparing the first set of attributes corresponding to the first media asset with the second set of attributes corresponding to the second media asset, is further configured to:
retrieve a first attribute having a first data format from the
first set of attributes and a second attribute having a
second data format from the second set of attributes;

translate, via a lookup table specifying variations of data formats corresponding to each attribute type, the first attribute having the first data format to the second data format; and compare the translated first attribute with the second attribute.

19. The system of claim 11, wherein the processing circuitry, when comparing the first set of attributes corresponding to the first media asset with the second set of attributes corresponding to the second media asset to generate a similarity metric between the first media asset and the second media asset, is further configured to:

for each attribute from the first set of attributes:
   determine whether an attribute from the first set of attributes overlaps with a respective attribute from the second set of attributes for more than a pre-defined threshold; and
   in response to determining that the respective attributes overlap, compute a respective overlap percentage that the respective attributes from the first set of attributes overlap with the respective matching attributes from the second set of attributes; and
determine the similarity metric by computing a weighted sum over all overlap percentages between the attributes from the first set of attributes and their respective matching attributes, wherein each overlap percentage is weighted by a respective pre-defined weight corresponding to a type of the respective attribute;
retrieve, from a database, a comparison logic rule specifying a matching scenario where an attribute match for a first type of attribute and an attribute mismatch for a second type of attribute are identified;

determine whether attributes of the first type and of second type from the first set of attributes and counterpart attributes of the first type and of second type from the second set of attributes satisfy the matching scenario specified in the comparison logic rule; and in response to determining that the attributes of the first type and of second type from the first set of attributes and the counterpart attributes of the first type and of second type from the second set of attributes satisfy the matching scenario specified in the comparison logic rule, apply a comparison result specified in the comparison logic rule that indicates whether the first media asset and the second media asset correspond to the same media content.

20. The system of claim 11, wherein the first storage device is located at a digital video recorder, and the second storage device is located at a mobile device, and wherein the processing circuitry is further configured to:

in response to determining that the first media asset and the second media asset correspond to the same media content:
   determine whether one of the first media asset and the second media asset has a display format that is adapted to a first display associated with the mobile device; and
   in response to determining that the second media asset has the display format that is adapted to the first display associated with the mobile device, transfer the second media asset from the digital video recorder to the mobile device.

* * * * *